(12) United States Patent
Lee et al.

(10) Patent No.: US 12,625,777 B2
(45) Date of Patent: May 12, 2026

(54) DATA BACKUP METHOD OF STORAGE DEVICE USING SENSOR INFORMATION, AND STORAGE DEVICE AND STORAGE SYSTEM PERFORMING THE SAME

(71) Applicant: Samsung Electronics Co., Ltd., Suwon-si (KR)

(72) Inventors: Ganggyu Lee, Suwon-si (KR); Insup Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 155 days.

(21) Appl. No.: 18/348,836

(22) Filed: Jul. 7, 2023

(65) Prior Publication Data

US 2024/0160532 A1      May 16, 2024

(30) Foreign Application Priority Data

Nov. 10, 2022    (KR) ......................... 10-2022-0149657

(51) Int. Cl.
| | | |
|---|---|---|
| *G06F 11/14* | (2006.01) | |
| *G06F 11/1446* | (2026.01) | |
| *G06F 11/30* | (2006.01) | |

(52) U.S. Cl.
CPC ...... *G06F 11/1461* (2013.01); *G06F 11/1466* (2013.01); *G06F 11/3058* (2013.01)

(58) Field of Classification Search
CPC ............. G06F 11/1461; G06F 11/1466; G06F 11/3058; G06F 11/0739; G06F 11/0778;
(Continued)

(56) References Cited

U.S. PATENT DOCUMENTS

| | | | | |
|---|---|---|---|---|
| 6,763,479 B1 * | 7/2004 | Hebert | ................ | G06F 11/2007 |
| | | | | 714/4.11 |
| 7,679,133 B2 | 3/2010 | Son et al. | | |

(Continued)

FOREIGN PATENT DOCUMENTS

| | | | | |
|---|---|---|---|---|
| EP | 2341368 B1 * | 7/2016 | ........... | G01S 15/931 |
| EP | 3564086 A1 | 11/2019 | | |

(Continued)

OTHER PUBLICATIONS

Disaster Recovery VS High Availability (45 Drives, Protocase Inc, Jul. 2021) (Year: 2021).*

(Continued)

*Primary Examiner* — Ashish Thomas
*Assistant Examiner* — Kayo Lisa Rusin
(74) *Attorney, Agent, or Firm* — Harness, Dickey & Pierce, P.L.C.

(57)      ABSTRACT

In a data backup method of a storage device, environment information is received from at least one environmental sensor such that an operating environment in which the storage device is operating is monitored. An event detection signal is generated based on the environment information. In response to generating the event detection signal at least first data is immediately backed up to an external device located outside the storage device. The storage device includes a first port configured to be used to store the plurality of data in the storage device, and a second port different from the first port. In response to generating the event detection signal, the at least first data among the plurality of data are immediately output from the storage device through the second port.

19 Claims, 30 Drawing Sheets

(58) Field of Classification Search
CPC ............. G06F 11/1456; G06F 11/1458; G06F 11/1448; G06F 11/1469; G06F 11/1464; G07C 5/0841
See application file for complete search history.

(56) References Cited

U.S. PATENT DOCUMENTS

| | | | |
|---|---|---|---|
| 8,553,466 B2 | 10/2013 | Han et al. | |
| 8,559,235 B2 | 10/2013 | Yoon et al. | |
| 8,654,587 B2 | 2/2014 | Yoon et al. | |
| 10,109,119 B2 | 10/2018 | Keane et al. | |
| 10,580,232 B2 * | 3/2020 | Jiang | G07C 5/0825 |
| 11,129,000 B2 | 9/2021 | Kim | |
| 11,347,218 B2 | 5/2022 | Wang | |
| 2007/0136541 A1 | 6/2007 | Herz et al. | |
| 2011/0233648 A1 | 9/2011 | Seol et al. | |
| 2013/0167159 A1 * | 6/2013 | Ricci | G08G 1/096725 |
| | | | 719/319 |
| 2017/0060694 A1 | 3/2017 | Makhov et al. | |
| 2017/0123428 A1 * | 5/2017 | Levinson | B60W 60/0011 |
| 2019/0339697 A1 | 11/2019 | Kapuria et al. | |
| 2020/0103079 A1 | 4/2020 | Karabacak et al. | |
| 2021/0073083 A1 * | 3/2021 | Solanke | G06F 11/1451 |
| 2021/0076181 A1 | 3/2021 | Kim | |
| 2021/0084463 A1 | 3/2021 | Kim | |
| 2021/0176611 A1 | 6/2021 | Kim | |
| 2021/0335061 A1 * | 10/2021 | Claessens | G07C 5/0816 |
| 2021/0373780 A1 * | 12/2021 | Ferrari | G06F 3/0653 |
| 2022/0035371 A1 | 2/2022 | Chan et al. | |
| 2022/0351553 A1 * | 11/2022 | Heiser | G07C 5/0816 |
| 2023/0205647 A1 * | 6/2023 | Sharma | G06F 11/1464 |
| | | | 714/15 |
| 2023/0385154 A1 * | 11/2023 | Karr | H04L 67/1095 |

FOREIGN PATENT DOCUMENTS

| | | | | |
|---|---|---|---|---|
| KR | 2006-0059040 A | * | 6/2006 | G06F 15/16 |
| KR | 10-1953744 B1 | | 3/2019 | |
| KR | 10-2022-0011568 A | | 1/2022 | |
| KR | 10-2022-0046528 A | | 4/2022 | |
| KR | 10-2022-0084456 A | | 6/2022 | |

OTHER PUBLICATIONS

Altera Corporations (Internal Memory (RAM and ROM) User Guide, Nov. 2009) (Year: 2009).*
EP2341368B1 translation from ip.com (Year: 2024).*
KR20060059040A translation from ip.com (Year: 2024).*
J. Wang, J. Liu and N. Kato, "Networking and Communications in Autonomous Driving: A Survey," in IEEE Communications Surveys & Tutorials, vol. 21, No. 2, pp. 1243-1274, Secondquarter 2019, doi: 10.1109/COMST.2018.2888904. (Year: 2018).*
Codestar, "Difference between external port and internal port in port forwarding?", superuser, posted Mar. 4, 2022, accessed on Dec. 2, 2025. (Year: 2022).*
Sashoalm, "What is the difference between a port number and a protocol number? [closed]," Stack Overflow, posted Feb. 25, 2009, accessed on Dec. 2, 2025. (Year: 2009).*
Extended European Search report issued Mar. 5, 2024 in European Application No. 23196650.8.

* cited by examiner

10a

10a

10c

10d

10e

DATA BACKUP METHOD OF STORAGE DEVICE USING SENSOR INFORMATION, AND STORAGE DEVICE AND STORAGE SYSTEM PERFORMING THE SAME

CROSS-REFERENCE TO RELATED APPLICATION

This application claims priority under 35 USC § 119 to Korean Patent Application No. 10-2022-0149657 filed on Nov. 10, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to data backup methods of storage devices using sensor information, storage devices performing the data backup methods, and storage systems performing the data backup methods.

2. Description of the Related Art

One or more semiconductor memory devices may be used in data storage devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Various systems, e.g., a laptop computer, a car, an airplane, a drone, etc., have adopted SSDs for data storage. For example, SSDs are included in autonomous vehicles (or systems) and are used to store various data generated during driving of the autonomous vehicles.

SUMMARY

At least one example embodiment of the present disclosure provides a data backup method of a storage device capable of efficiently backing up data internally stored in the storage device when an emergency situation such as fire or flooding occurs.

At least one example embodiment of the present disclosure provides a storage device performing the data backup method and a storage system performing the data backup method.

According to example embodiments, in a data backup method of a storage device, the method may include receiving environment information from at least one environmental sensor such that an operating environment in which the storage device is operating is monitored; generating an event detection signal based on a determination that the environment information indicates that an emergency situation, in which the operating environment has changed to be out of a reference range, has occurred; and immediately outputting at least first data, among a plurality of data stored in the storage device, such that the at least first data is backed up to an external device located outside the storage device in response to the generating the event detection signal. The storage device includes a first port configured to be used to in the storing of the plurality of data in the storage device, and a second port different from the first port, and wherein, in response to generating the event detection signal, the outputting the at least first data among the plurality of data are immediately includes outputting the at least first data from the storage device through the second port.

According to example embodiments, a storage device includes a plurality of nonvolatile memories, a storage controller, a first port, at least one first environmental sensor, a backup logic circuit and a second port. The plurality of nonvolatile memories store a plurality of data. The storage controller controls operations of the plurality of nonvolatile memories. The first port is connected to the storage controller and is configured to be used to store the plurality of data in the plurality of nonvolatile memories. The at least one first environmental sensor monitors an operating environment in which the storage device is operating. The backup logic circuit controls a data backup operation of backing up the plurality of data to an external device. The external device is located outside the storage device. The second port is connected to the backup logic circuit, and is different from the first port. The backup logic circuit may be configured to receive first environment information from the at least one first environmental sensor, generate an event detection signal based on a determination that the first environment information indicates that an emergency situation, in which the operating environment has changed to be out of a reference range, has occurred, and immediately output at least first data, among the plurality of data, from the storage device such that the at least first data is backed up to the external device in response to the generated event detection signal.

According to example embodiments, in a data backup method of a storage device included in an autonomous driving system, the method may include periodically receiving at least one of a current temperature of an operating environment or a current amount of water in the operating environment from at least one environmental sensor; periodically outputting at least first data, among a plurality of autonomous driving-related data stored the storage device, such that the at least first data among the plurality of autonomous driving-related data stored in the storage device are backed up to an external device located outside the storage device; generating a fire detection signal representing that fire has occurred in the autonomous driving system in response to the current temperature becoming higher than a reference temperature or generating a flooding detection signal representing that flooding has occurred in the autonomous driving system in response to the current amount of water becoming larger than a reference amount of water; and immediately outputting at least second data, among the plurality of autonomous driving-related data, in response to at least one of the generated fire detection signal or the generated flooding detection signal such that the at least second data among the plurality of autonomous driving-related data are immediately backed up to the external device, herein the storage device includes a first port configured to be used to store the plurality of autonomous driving-related data in the storage device, and a second port different from the first port, and configured to be used to back up the plurality of autonomous driving-related data to the external device, and wherein immediately outputting the at least second data among the plurality of autonomous driving-related data includes identifying backup target data among the plurality of autonomous driving-related data, the backup target data being collected from a first time point at which a data backup operation was most recently performed to a second time point at which at least one of the fire or flooding occurred, checking whether a first network interface operates normally, the first network interface located outside the storage device, included in the autonomous driving system, and configured to be used for an external communication, in response to determining that the first network interface is operating normally, immediately outputting the backup target data through the second port to transmit the backup target data to an external server through the first network interface and at least one external network, the external server and the at least one external network being located outside the autonomous driving system, and in response to determining that the first network interface is operating abnormally, immediately outputting the backup target data to a secondary storage device through the second port, the secondary storage device being located outside the storage device and being included in the autonomous driving system.

According to example embodiments, a storage system includes a storage device, at least one first environmental sensor, a first network interface and a secondary storage device. The storage device stores a plurality of data. The at least one first environmental sensor monitors an operating environment in which the storage device is operating. The first network interface communicates with an external server. The external server is located outside the storage system. The secondary storage device is configured to back up the plurality of data. The storage device includes a plurality of nonvolatile memories, a storage controller, a first port, a backup logic circuit and a second port. The plurality of nonvolatile memories store the plurality of data. The storage controller controls operations of the plurality of nonvolatile memories. The first port is connected to the storage controller, and is configured to be used to store the plurality of data in the plurality of nonvolatile memories. The backup logic circuit controls a data backup operation of backing up the plurality of data to at least one of the external server or the secondary storage device. The second port is connected to the backup logic circuit, and is different from the first port. The backup logic circuit may be configured to receive first environment information from the at least one first environmental sensor, generate an event detection signal based on a determination that the environment information indicates that an emergency situation, in which the operating environment has changed to be out of a reference range, has occurred, and immediately output at least first data, among the plurality of data, such that the at least first data among the plurality of data is immediately backed up to at least one of the external server or the secondary storage device in response to the generated event detection signal.

In the data backup method, the storage device and the storage system according to some example embodiments, the operating environment of the storage device may be monitored using the environmental sensor. When it is determined, based on the result of the monitoring operation, that the emergency situation, such as fire or flooding, has occurred, the data stored in the storage device may be backed up to the outside of the storage device (e.g., to the external server and/or the external secondary storage device). Accordingly, the data stored in the storage device may be preserved securely and efficiently.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
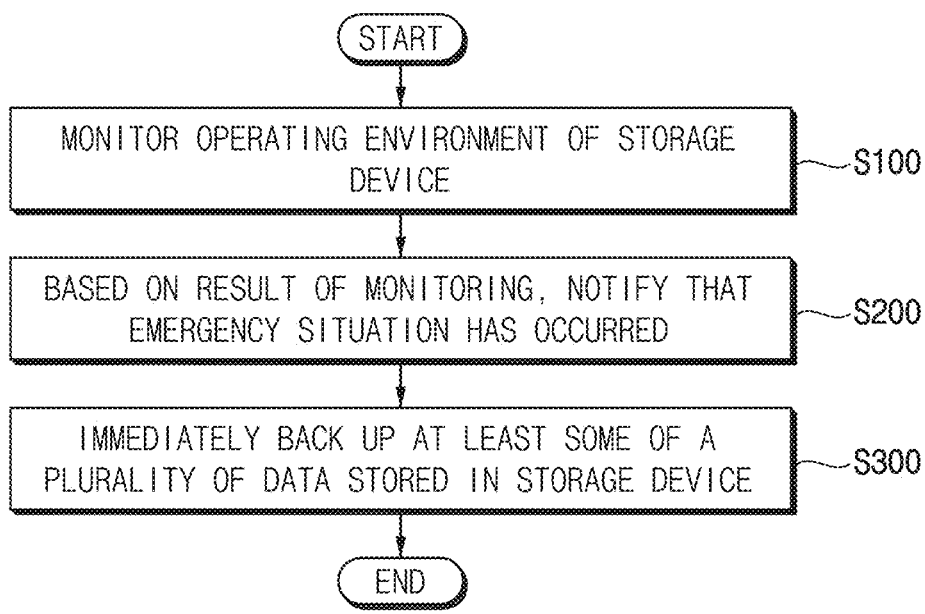
FIG. 1 is a flowchart illustrating a data backup method of a storage device according to some example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

The functional elements, blocks, and/or " . . . units" disclosed below may include or be implemented in processing circuitry such as hardware including logic circuits; a hardware/software combination such as a processor executing software; and/or a combination thereof, unless expressly indicated otherwise. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

FIG. 1 is a flowchart illustrating a data backup method of a storage device according to some example embodiments.

Referring to FIG. 1, a data backup method according to at least some example embodiments is performed by a storage device that includes a plurality of nonvolatile memories and a backup logic circuit. The plurality of nonvolatile memories store a plurality of data, and the backup logic circuit controls a data backup operation of backing up the plurality of data to the outside of the storage device. Configurations of the storage device and a storage system including the storage device will be described with reference to FIG. 3 and the like.

In the data backup method of the storage device, an operating environment in which the storage device is operating is monitored (operation S100), and the storage device is notified, based on a result of the monitoring operation, that an emergency situation (or condition) in which the operating environment changes to out of a desired and/or alternatively predetermined reference range has occurred (operation S200). For example, the operating environment may be monitored using at least one environmental sensor located inside and/or outside the storage device and, the monitoring operation may use e.g., the sensor information obtained and/or collected from the at least one environmental sensor. For example, the emergency situation may represent and/or indicate a situation in which the storage device and/or the plurality of data stored in the storage device are highly likely to be damaged, unrecoverable, and/or unusable. Operations S100 and S200 will be described with reference to FIGS. 2, 7 and 9.

When the emergency situation occurs, at least some of the plurality of data (e.g., at least first data among the plurality of data) stored in the storage device are immediately backed up to the outside of the storage device (e.g., an external device located outside the storage device) (operation S300). For example, the at least some of the plurality of data may be backed up in at least one of an external server and an external secondary storage device that are located outside the storage device. Operation S300 will be described with reference to FIGS. 14, 18, 22 and 25.

Figure 2:
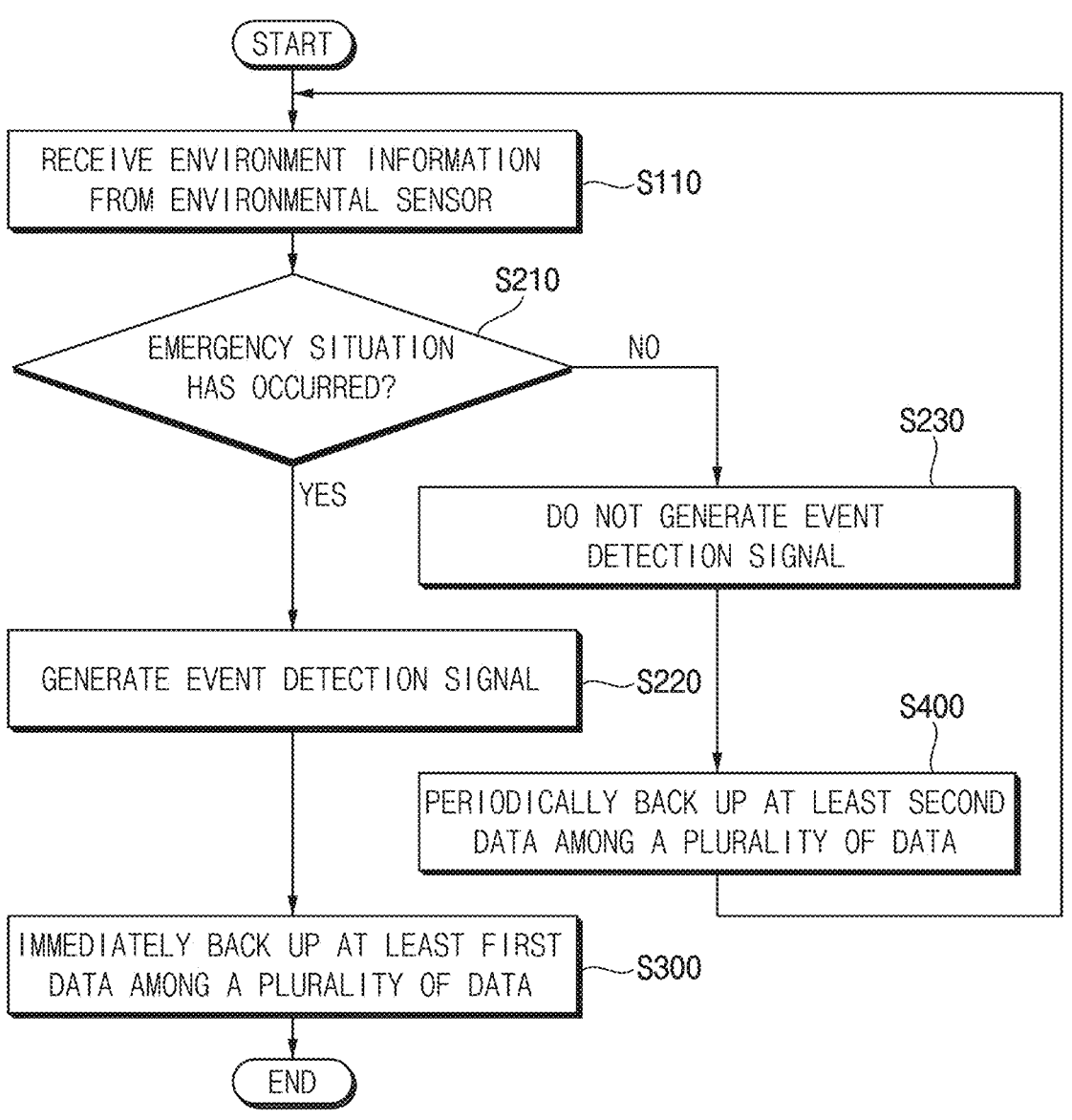
FIG. 2 is a flowchart illustrating an example of a data backup method of a storage device of FIG. 1.

FIG. 2 is a flowchart illustrating an example of a data backup method of a storage device of FIG. 1.

Referring to FIGS. 1 and 2, when monitoring the operating environment of the storage device (operation S100), environment information is received from the at least one environmental sensor located inside and/or outside the storage device (operation S110). For example, the environment information may be received periodically, e.g., regularly at desired and/or alternatively predetermined periods, cycles, and/or intervals. However, the example embodiments are not limited thereto, and the environment information may be additionally and/or alternatively received non-periodically and/or based on a request by the storage device.

In some example embodiments, the at least one environmental sensor may include at least one of a temperature sensor, a mechanical sensor, and/or a water sensor. For example, the environment information may include at least one of a current temperature of the operating environment obtained from the temperature sensor, a current mechanical and/or structural condition of a structure in the operating environment, and/or the current amount of water in the operating environment obtained from the water sensor. However, the example embodiments are not limited thereto, and the at least one environmental sensor may include various sensors for monitoring various factors of the operating environment.

When notifying that the emergency situation has occurred (operation S200), an event detection signal representing that the emergency has occurred is selectively generated. The data backup operation is performed in different manners depending on whether the event detection signal is generated or not.

For example, when it is determined, based on the environment information, that the emergency situation (e.g., in which the operating environment changes out of the reference range) has occurred (operation S210: YES), the event detection signal (representing that the emergency has occurred) is generated (operation S220). For example, it may be checked or determined whether the emergency situation has occurred by comparing reference information with the environment information received in operation S110. Thereafter, when the event detection signal is generated, the at least first data among the plurality of data are immediately output from the storage device such that at least first data among the plurality of data stored in the storage device are immediately backed up to the external device located outside the storage device (operation S300). Operation S300 in FIG. 2 may be substantially the same as operation S300 in FIG. 1.

In some example embodiments, when the at least one environmental sensor includes at least one of the temperature sensor (or fire detection sensor), the mechanical sensor, and/or the water sensor (or flooding detection sensor or moisture detection sensor), the emergency situation may include at least one of a fire situation in which the current temperature becomes higher than a reference temperature, a structural situation in which a structural housing (or support) has deformed (or crumpled), and/or a flooding situation in which the current amount of water becomes larger than the reference amount of water. For example, the event detection signal may include at least one of a fire detection signal representing the fire situation, a structural detection signal representing an impact, a flooding detection signal representing the flooding situation, and/or the like. However, the example embodiments are not limited thereto, and the emergency situation may include various situations and/or conditions in which the storage device and/or the plurality of data are highly likely to be damaged.

In some example embodiments, as will be described with reference to FIG. 3, the storage device may include a first port used to store the plurality of data in the storage device, and a second port different from the first port. In operation S300, based on the generation of the event detection signal, the at least first data among the plurality of data may be immediately output from the storage device through the second port. For example, a path for the data storage operation and a path for a data backup operation may be formed independently, individually and/or separately in the storage device.

When it is determined, based on the environment information, that the emergency situation has not occurred (operation S210: NO), the event detection signal is not generated (operation S230). Thereafter, when the event detection signal is not generated, at least second data among the plurality of data are periodically output from the storage device such that the at least second data among the plurality of data stored in the storage device are periodically backed up to the external device located outside the storage device (operation S400). Operation S400 will be described with reference to FIG. 11.

In some example embodiments, as will be described with reference to FIG. 31, the storage device may be included in an autonomous driving system. For example, the plurality of data stored in the storage device may be a plurality of autonomous driving-related data that are continuously generated, collected, and stored during the period of time while the autonomous driving system is operating (e.g., while an autonomous vehicle (or automated vehicle) including the autonomous driving system is driving). For example, the plurality of autonomous driving-related data may include at least one of Data Storage System for Automated Driving (DSSAD) data and/or Event Data Recorder (EDR) data. However, the example embodiments are not limited thereto, and the plurality of data may further include sensitive data, important data, and/or critical data (such as personal information) that needs to be backed up.

For autonomous vehicles, the installation of EDR and DSSAD has been mandated by regulations (e.g., J3197, UN R157, etc.) for accident cause analysis and accountability. For example, information for analyzing the cause of an accident (such as the brake operation, the speed before and after the accident, and/or the like) may be stored in the EDR; and/or information to identify responsibilities between a human driver and an automated lane keeping system (ALKS) (such as date/time information, information of changing the main driver, and/or the like) may be stored in the DSSAD. The EDR presently has no special requirements for data retention period, but DSSAD stipulates in at least one of the regulations (UN R157) to keep the data for at least six months. Currently, text-oriented data are stored in the EDR and the DSSAD, but when autonomous vehicles with a Society of Automotive Engineering (SAE) classification of level 3 (or higher level) appear in the future, it is expected that various sensor data and image data will also need to be stored, and the amount of data to be stored may increase significantly.

The EDR data may be stored in the storage device in the vehicle when the accident occurs, and the DSSAD data may be stored in the storage device in the vehicle when the main driver is changed. When the accident with serious vehicle damage occurs, information stored in the storage device may be lost due to the damage to the storage device. The EDR data may be preserved by storing it in the storage device when the accident occurs and by backing it up to an external server at the same time. The DSSAD data may be stored more frequently than EDR data and may have a large amount of data to be preserved, so it may be preserved by periodically performing backup operations. There is a possibility that the DSSAD data may be lost due to fire or flooding occurring between the backup operations that are periodically performed, so preparations for preventing the data loss are necessary.

In the data backup method of the storage device according to at least some example embodiments, the operating environment of the storage device may be monitored using the environmental sensor. When it is determined, based on the result of the monitoring operation, that the emergency situation (such as fire, impact, or flooding occurs), the data stored in the storage device may be backed up to the outside of the storage device (e.g., to the external server and/or the external secondary storage device). Accordingly, the data stored in the storage device may be preserved securely and efficiently.

Figure 3:
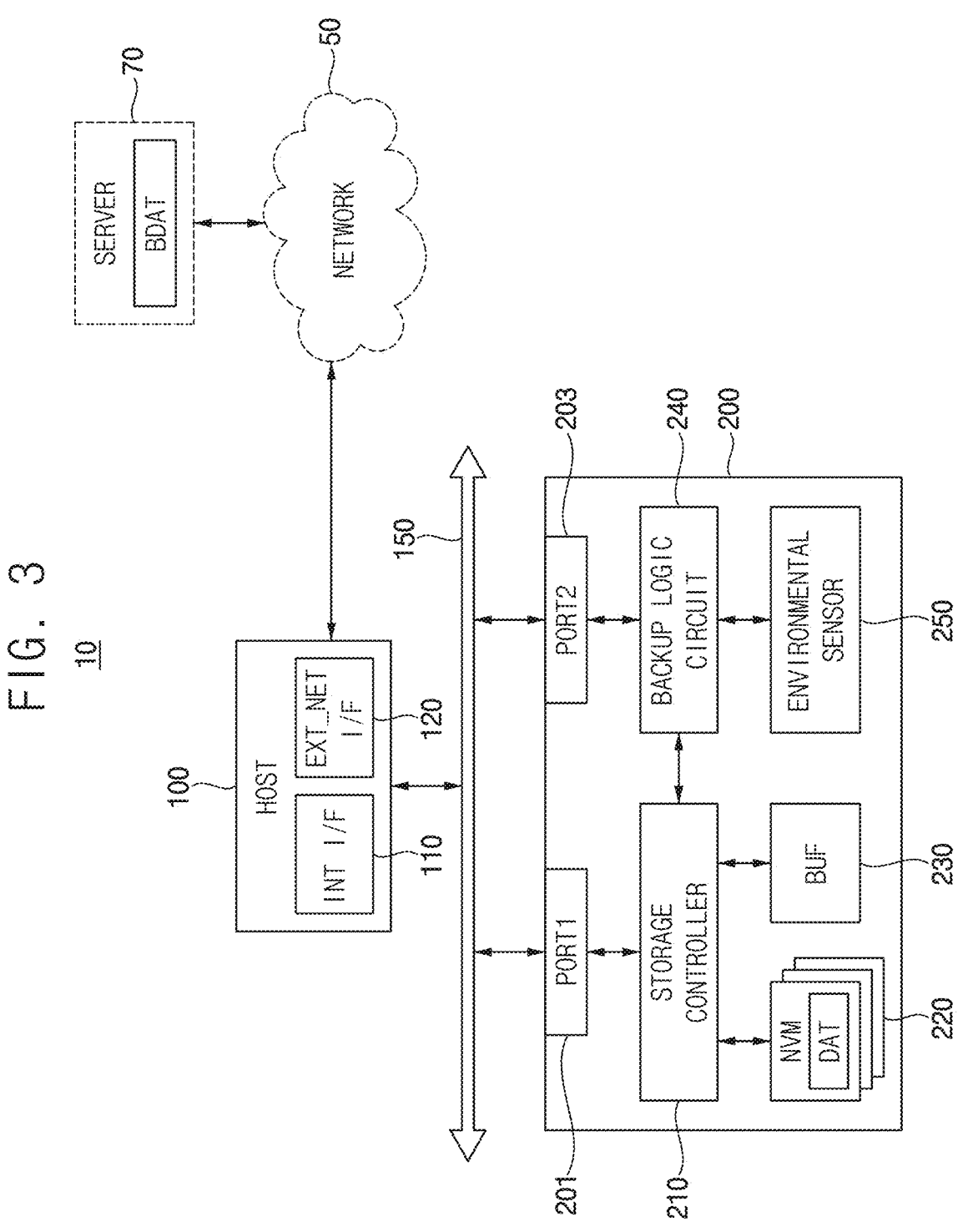
FIG. 3 is a block diagram illustrating a storage device and a storage system including the storage device according to some example embodiments.

FIG. 3 is a block diagram illustrating a storage device and a storage system including the storage device according to some example embodiments.

Referring to FIG. 3, a storage system 10 includes a host 100, a system bus 150 and a storage device 200. The host 100 and the storage device 200 may be electrically connected to the system bus 150 to communicate with each other.

In some example embodiments, the storage system 10 may be included in any electronic system. For example, as will be described with reference to FIG. 31, the storage system 10 may be (and/or be included in) an autonomous driving system and/or an advanced driver assistance system (ADAS) installed in an autonomous vehicle. However, the example embodiments are not limited thereto, and the storage system 10 may be included in any computing system, such as a personal computer (PC), a server computer, a data center, a workstation, a digital television, a set-top box, a navigation system, etc., and/or the storage system 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The host 100 is configured to control overall operations of the storage system 10. For example, when the storage system 10 is the autonomous driving system, the host 100 may include various components and/or elements that control an operation of the autonomous driving system. For example, the host 100 may include a plurality of electronic control units (ECUs).

The host 100 may include an internal interface (INT I/F) 110 and an external network interface (EXT_NET I/F) 120. The internal interface 110 may be used for internal communication of the storage system 10 (e.g., an operation of exchanging data with the storage device 200 inside the storage system 10) through the system bus 150. The external network interface 120 may be used for external communication of the storage system 10 (e.g., an operation of exchanging data with a server 70 outside the storage system 10) through a network 50. For example, the external network interface 120 may include a gateway ECU.

Although not illustrated in FIG. 3, the host 100 may include a host processor and a host memory. The host processor may be configured to control an operation of the host 100. For example, the host processor may execute an operating system. For example, the operating system may include a file system for file management, and a device driver for controlling peripheral devices including the storage device 200 at the operating system level. The host memory may store the operating system, instructions, and/or data that are executed and/or processed by the host processor.

The network 50 and the server 70 may be located outside the storage system 10. The network 50 may connect the storage system 10 with the server 70. For example, the storage system 10 and the server 70 may communicate with each other (and/or may exchange data and/or signals) through the external network interface 120 in the host 100 and the network 50.

In some example embodiments, the network 50 may be a wireless network for exchanging data over relatively long distances. For example, the network 50 may be implemented based on a wireless mobile communication protocol such as a third-generation (3G) mobile communication, a fourth-generation (4G) mobile communication, a long term evolution (LTE) mobile communication, a fifth-generation (5G) mobile communication, and/or the like.

In some example embodiments, the storage device 200 and the storage system 10 including the storage device 200 may be disposed or located in a first space (e.g., a local space), and the server 70 may be disposed or located in a second space (e.g., a remote space) spaced apart from the first space. For example, when the storage system 10 is the autonomous driving system, the first space may be an interior of the autonomous vehicle including the autonomous driving system, and the second space may be a building (e.g., a data center including the server 70) spaced apart from the autonomous vehicle.

The storage device 200 is accessed by the host 100. The storage device 200 may include a first port 201, a second port 203, a storage controller 210, a plurality of nonvolatile memories (NVMs) 220, a buffer memory (BUF) 230, a backup logic circuit 240, and an environmental sensor 250.

In some example embodiments, the storage device 200 may be at least one of a solid state drive (SSD), a universal flash storage (UFS), a multi-media card (MMC), an embedded multi-media card (eMMC), a secure digital (SD) card, a micro SD card, a memory stick, a chip card, a universal serial bus (USB) card, a smart card, a compact flash (CF) card, and/or the like.

The storage controller 210 may control an operation of the storage device 200. For example, based on requests and data received from the host 100, the storage controller 210 may control operations of the plurality of nonvolatile memories 220.

The plurality of nonvolatile memories 220 may be controlled by the storage controller 210, and may store a plurality of data DAT. For example, the plurality of nonvolatile memories 220 may store meta data, various user data, and/or the like. For example, when the storage system 10 is the autonomous driving system, the plurality of data DAT may include a plurality of autonomous driving-related data that are generated, collected, and stored by the lapse of time while the autonomous driving system is operating.

In some example embodiments, each of the plurality of nonvolatile memories 220 may include at least one of a NAND flash memory, an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and/or the like.

The buffer memory 230 may store instructions and/or data that are executed and/or processed by the storage controller

210, and may temporarily store data retrieved from or to be stored into the plurality of nonvolatile memories 220. For example, the buffer memory 230 may include at least one of various volatile memories, e.g., a static random access memory (SRAM), a dynamic random access memory (DRAM), and/or the like.

The environmental sensor 250 may monitor an operating environment in which the storage device 200 is operating. The backup logic circuit 240 may communicate with the storage controller 210 and the environmental sensor 250, and may control a data backup operation of backing up the plurality of data DAT to the outside of the storage device 200. For example, based on a result of the monitoring operation using the environmental sensor 250, the backup logic circuit 240 may transmit at least some (e.g., backup target data BDAT) of the plurality of data DAT to the server 70 outside the storage device 200, and the at least some (e.g., the backup target data BDAT) of the plurality of data DAT may be stored in the server 70. FIG. 3 illustrates an example where the environmental sensor 250 is disposed inside the storage device 200 and the backup target data BDAT is backed up to the server 70.

The first port 201 may be connected to the storage controller 210, and may be used to store the plurality of data DAT in the plurality of nonvolatile memories 220. The second port 203 may be connected to the backup logic circuit 240, may be different from the first port 201, and may be implemented independently, individually and/or physically separated from the first port 201.

In some example embodiments, the first port 201 may be implemented based on a data transmission protocol such as a nonvolatile memory express (NVMe), a universal flash storage (UFS), an embedded MultiMedia Card (eMMC), an advanced technology attachment (ATA), a serial ATA (SATA), a parallel ATA (PATA), a small computer small interface (SCSI), a serial attached SCSI (SAS), a peripheral component interconnect express (PCIe), and/or the like. In some example embodiments (e.g., when the storage system 10 is the autonomous driving system), the second port 203 may be implemented based on a vehicle communication protocol such as a controller area network (CAN), a local interconnect network (LIN), a media oriented system transport (MOST), and/or the like.

The storage device 200 may perform the data backup method according to the at least some example embodiments described with reference to FIG. 1, using the second port 203, the backup logic circuit 240 and the environmental sensor 250. For example, the backup logic circuit 240 may receive environment information from the environmental sensor 250, may generate an event detection signal representing that an emergency situation in which the operating environment changes (e.g., to out of a reference range) has occurred based on the environment information, and may immediately output the backup target data BDT among the plurality of data DAT from the storage device 200 through the second port 203 based on the generation of the event detection signal such that the backup target data BDT are immediately backed up to the server 70 outside the storage device 200.

Figure 4:
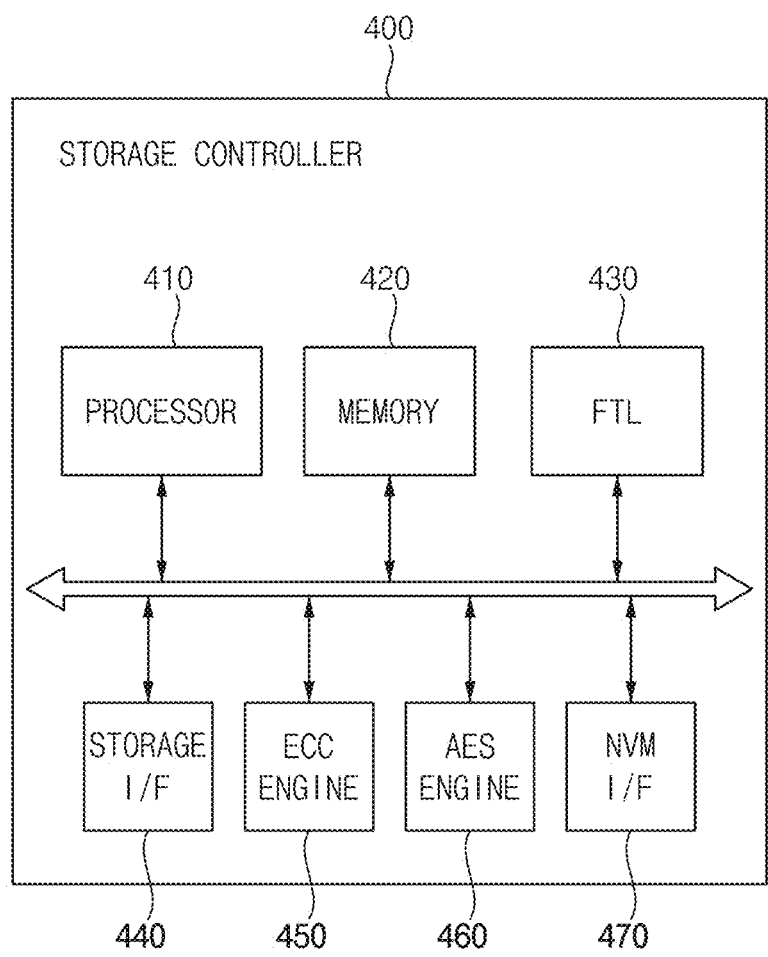
FIG. 4 is a block diagram illustrating an example of a storage controller included in a storage device according to some example embodiments.

FIG. 4 is a block diagram illustrating an example of a storage controller included in a storage device according to some example embodiments.

Referring to FIG. 4, a storage controller 400 may include a processor 410, a memory 420, a flash translation layer (FTL) 430, a storage interface (I/F) 440, an error correction code (ECC) engine 450, an advanced encryption standard (AES) engine 460, and a nonvolatile memory interface 470.

In at least some embodiments, the storage controller 400 may be included in a storage device (e.g., the storage device 200 of FIG. 3) and/or may be the same (or substantially similar) to the storage controller 210 in FIG. 3.

The processor 410 may control an operation of the storage controller 400. For example, the processor 410 may control an operation of a storage device (e.g., the storage device 200 in FIG. 3), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The FTL 430 may perform various functions, such as an address mapping operation, a wear-leveling operation, a garbage collection operation, and/or the like. The address mapping operation may be an operation of converting a logical address received from a host (e.g., the host 100 in FIG. 3) into a physical address used to actually store data in a nonvolatile memory (e.g., the nonvolatile memory 220 in FIG. 3). The wear-leveling operation may be a technique for preventing excessive deterioration of a specific block of the nonvolatile memory by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., and/or may perform ECC encoding and ECC decoding using above-described codes or other error correction codes.

The AES engine 460 may perform at least one of an encryption operation and a decryption operation on data input to the storage controller 400 by using a symmetric-key algorithm. Although not illustrated in detail, the AES engine 460 may include an encryption module and a decryption module. For example, the encryption module and the decryption module may be implemented as separate modules. For another example, one module configured to perform both encryption and decryption operations may be implemented in the AES engine 460.

The storage interface 440 may be connected to a first port (e.g., the first port 201 in FIG. 3), and may provide a connection between the storage device and an external device (e.g., the host 100 in FIG. 3). The storage interface 440 may provide an interface corresponding to a bus format of the host for communication between the host and the storage device. In some example embodiments, the bus format of the host may be an NVMe, an UFS, an eMMC, an ATA, a SATA, a PATA, a SCSI, a SAS, a PCIe, and/or the like.

The nonvolatile memory interface 470 may exchange data with the nonvolatile memory. The nonvolatile memory interface 470 may transfer data to the nonvolatile memory, and/or may receive data read from the nonvolatile memory. For example, the nonvolatile memory interface 470 may be configured to comply with a standard protocol, such as Toggle or open NAND flash interface (ONFI).

Figure 5:
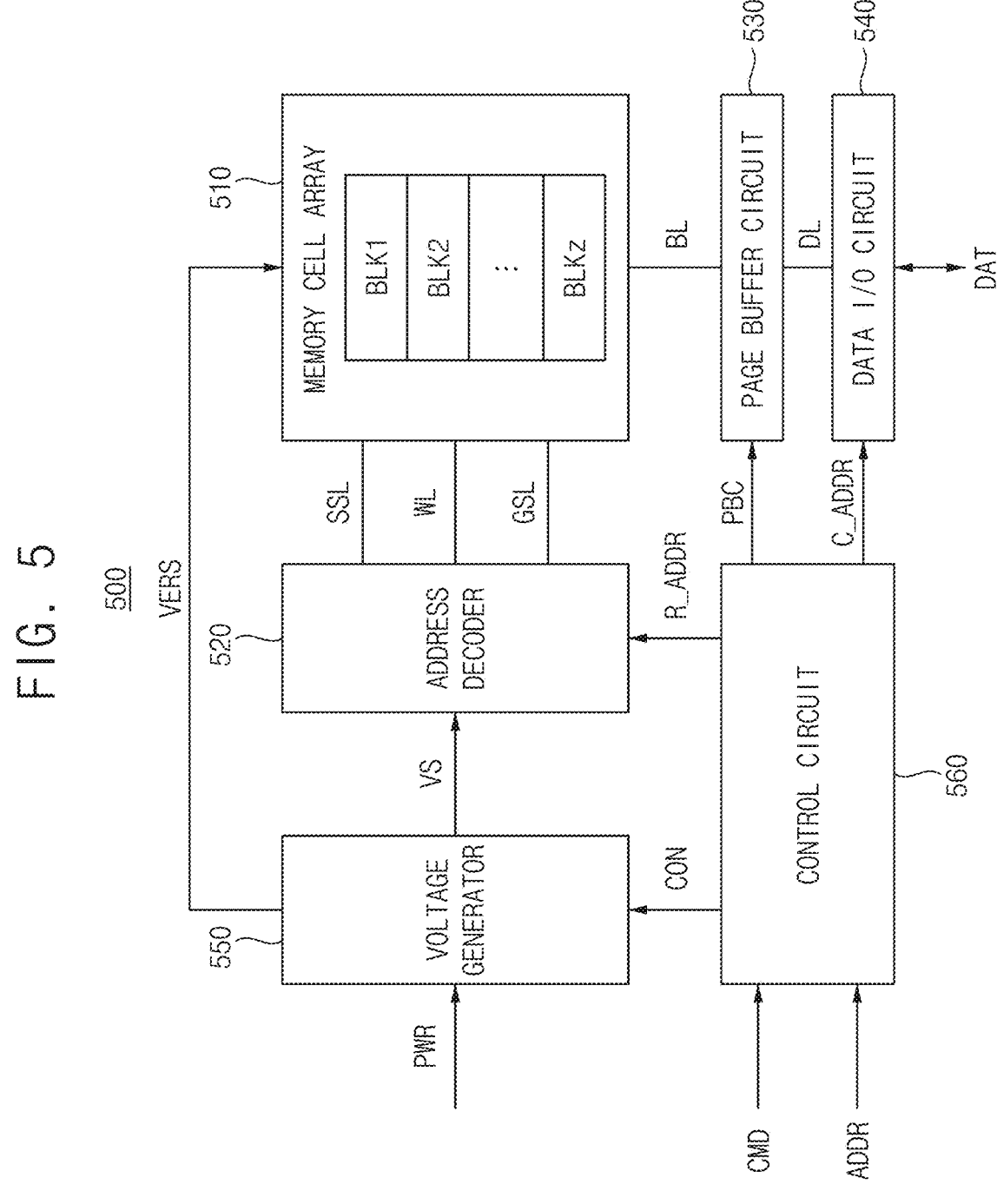
FIG. 5 is a block diagram illustrating an example of a nonvolatile memory included in a storage device according to some example embodiments.

FIG. 5 is a block diagram illustrating an example of a nonvolatile memory included in a storage device according to some example embodiments.

Referring to FIG. 5, a nonvolatile memory 500 may include a memory cell array 510, an address decoder 520, a page buffer circuit 530, a data input/output (I/O) circuit 540, a voltage generator 550 and a control circuit 560. In at least some embodiments, the nonvolatile memory 500 may be included in a storage device (e.g., the storage device 200 of FIG. 3) and/or may be the same (or substantially similar) to the nonvolatile memories 220 in FIG. 3.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may include a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 may receive a command CMD and an address ADDR from an outside (e.g., from the storage controller 210 in FIG. 3), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS (e.g., for an operation of the nonvolatile memory 500) based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly and/or via the bitline BL.

The page buffer circuit 530 may be connected to the memory cell array 510 via the plurality of bitlines BL. The page buffer circuit 530 may include a plurality of page buffers. The page buffer circuit 530 may store (or write) data DAT to be programmed into the memory cell array 510 or may read (or retrieve) data DAT sensed from the memory cell array 510. In this regard, the page buffer circuit 530 may operate as a write driver and/or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 and/or may provide the data DAT from the memory cell array 510 to the outside of the nonvolatile memory 500, based on the column address C_ADDR.

Although the nonvolatile memory included in the storage device according to some example embodiments is described based on a NAND flash memory, the nonvolatile memory according to example embodiments may be any nonvolatile memory, e.g., a PRAM, a RRAM, a NFGM, a PoRAM, a MRAM, a FRAM, and/or the like.

Figure 6:
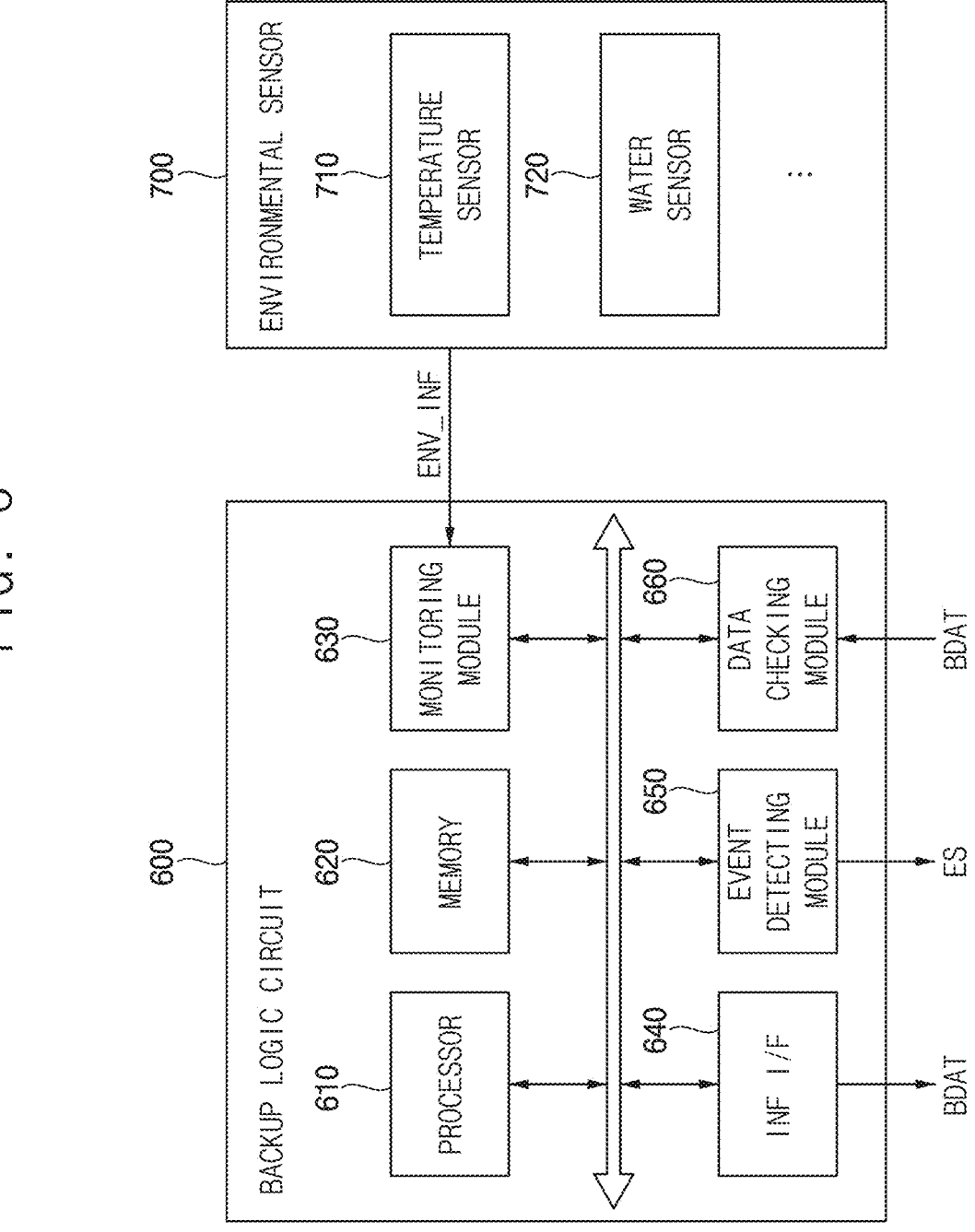
FIG. 6 is a block diagram illustrating examples of a backup logic circuit and an environmental sensor included in a storage device according to some example embodiments.

FIG. 6 is a block diagram illustrating examples of a backup logic circuit and an environmental sensor included in a storage device according to some example embodiments.

Referring to FIG. 6, a backup logic circuit 600 may include a processor 610, a memory 620, a monitoring module 630, an internal interface 640, an event detecting module 650 and a data checking module 660. An environmental sensor 700 may include a temperature sensor 710, a water sensor 720, and/or the like. In at least some embodiments, the backup logic circuit 600 and the environmental sensor 700 may be included in a storage device (e.g., the storage device 200 of FIG. 3) and/or may be, respectively, the same (or substantially similar) to the backup logic circuit 240 and the environmental sensor 250 in FIG. 3.

The environmental sensor 700 may obtain and collect environment information ENV_INF representing an operating environment of a storage device (e.g., the storage device 200 in FIG. 3). For example, the environment information ENV_INF may include at least one of temperature information obtained from the temperature sensor 710 and/or water information obtained from the water sensor 720.

However, example embodiments are not limited thereto, and the environmental sensor 700 may further include at least one of various sensors collecting various environment information, such as a humidity sensor, a pressure sensor, a motion sensor, a temporal sensor, a spatial sensor, an illumination sensor, an acceleration sensor, a vibration sensor, an external force sensor, a shock sensor, a radiation sensor, a dust sensor, a mechanical stress sensor, an electrical stress sensor, and/or the like.

The processor 610 may control an operation of the backup logic circuit 600. The memory 620 may store instructions and data executed and processed by the processor 610.

The monitoring module 630 may monitor the operating environment of the storage device based on the environment information ENV_INF provided from the environmental sensor 700.

The event detecting module 650 may generate an event detection signal ES based on the environment information ENV_INF. For example, when it is determined, based on the environment information ENV_INF, that an emergency situation (e.g., in which the operating environment changes to out of the reference range) has occurred, the event detecting module 650 may generate the event detection signal ES. The event detection signal ES may be provided to the storage controller 210. For example, as will be described with reference to FIGS. 8 and 10, the event detection signal ES may include at least one of a fire detection signal and a flooding detection signal. However, the example embodiments are not limited thereto, and the event detection signal ES may further include at least one signal representing at least one of various emergency situations.

The data checking module 660 may identify and receive the backup target data BDAT. For example, the data checking module 660 may have histories of generating and storing data and related backup operations. When the periodic backup operation of S400 is performed, or when the emergency backup operation (or immediate backup operation) of S300 is performed based on the generation of the event detection signal ES, the data checking module 660 may identify the backup target data BDAT that needs to be backed up among the plurality of data DAT, may request the backup target data BDAT to a storage controller (e.g., the storage controller 210 in FIG. 3), and may receive the backup target data BDAT from a nonvolatile memory (e.g., the nonvolatile memory 220 in FIG. 3) through a storage controller (e.g., the storage controller 210 in FIG. 3).

The internal interface 640 may be connected to a second port (e.g., the second port 203 in FIG. 3), and may provide a connection between the storage device and an external device (e.g., the host 100 in FIG. 3). The internal interface 640 may be similar to an internal interface included in the host (e.g., the internal interface 110 included in the host 100 in FIG. 3). For example, the internal interface 640 may provide an interface for the data backup operation based on a vehicle communication protocol such as a CAN, a LIN, a MOST, and/or the like, and may output the backup target data BDAT.

Figure 7:
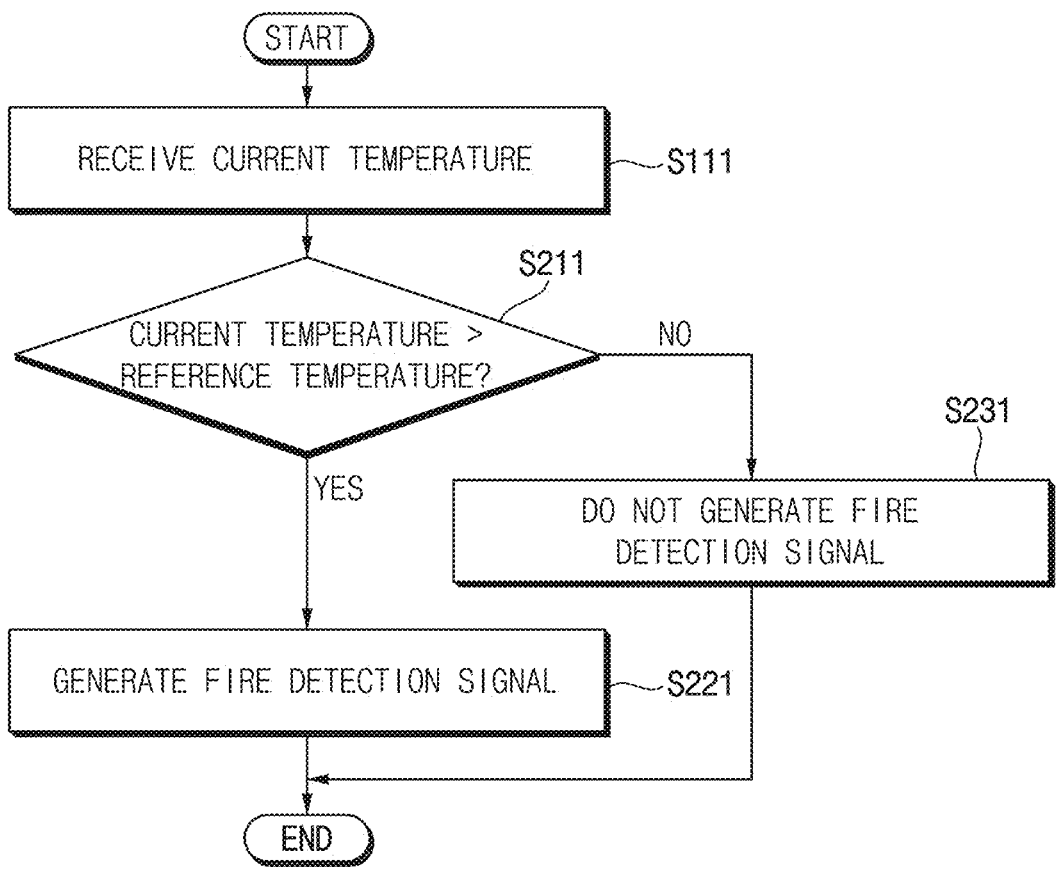
FIG. 7 is a flowchart illustrating examples of receiving environment information and selectively generating an event detection signal in FIG. 2.
Figure 8:
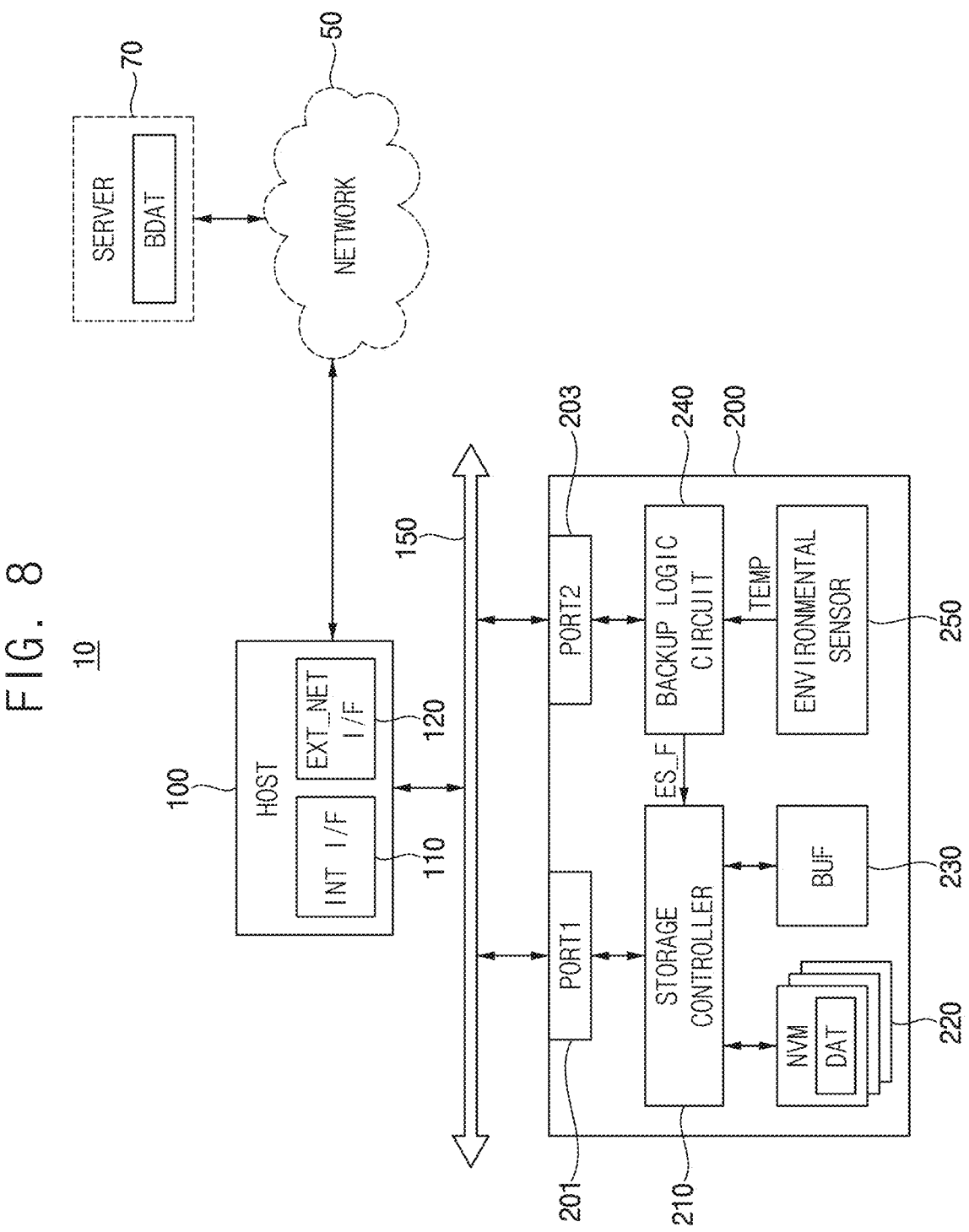
FIG. 8 is a diagram for describing an operation of FIG. 7.

FIG. 7 is a flowchart illustrating examples of receiving environment information and selectively generating an event detection signal in FIG. 2. FIG. 8 is a diagram for describing an operation of FIG. 7.

Referring to FIGS. 2, 6, 7 and 8, when receiving the environment information from the environmental sensor (operation S110), the backup logic circuit 240 may periodically receive a current temperature TEMP of the operating environment of the storage device 200 from the temperature sensor 710 (operation S111). The temperature sensor 710 may be referred to as a fire detection sensor.

When selectively generating the event detection signal based on the environment information (operations S210, S220 and S230), the current temperature TEMP may be compared with a reference temperature (operation S211). When the current temperature TEMP becomes higher than a reference temperature (operation S211: YES), the backup logic circuit 240 may generate a fire detection signal ES_F representing that fire has occurred (operation S221), and may provide the fire detection signal ES_F to the storage controller 210. When the current temperature TEMP is lower than or equal to the reference temperature (operation S211: NO), the backup logic circuit 240 may not generate the fire detection signal ES_F (operation S231).

Figure 9:
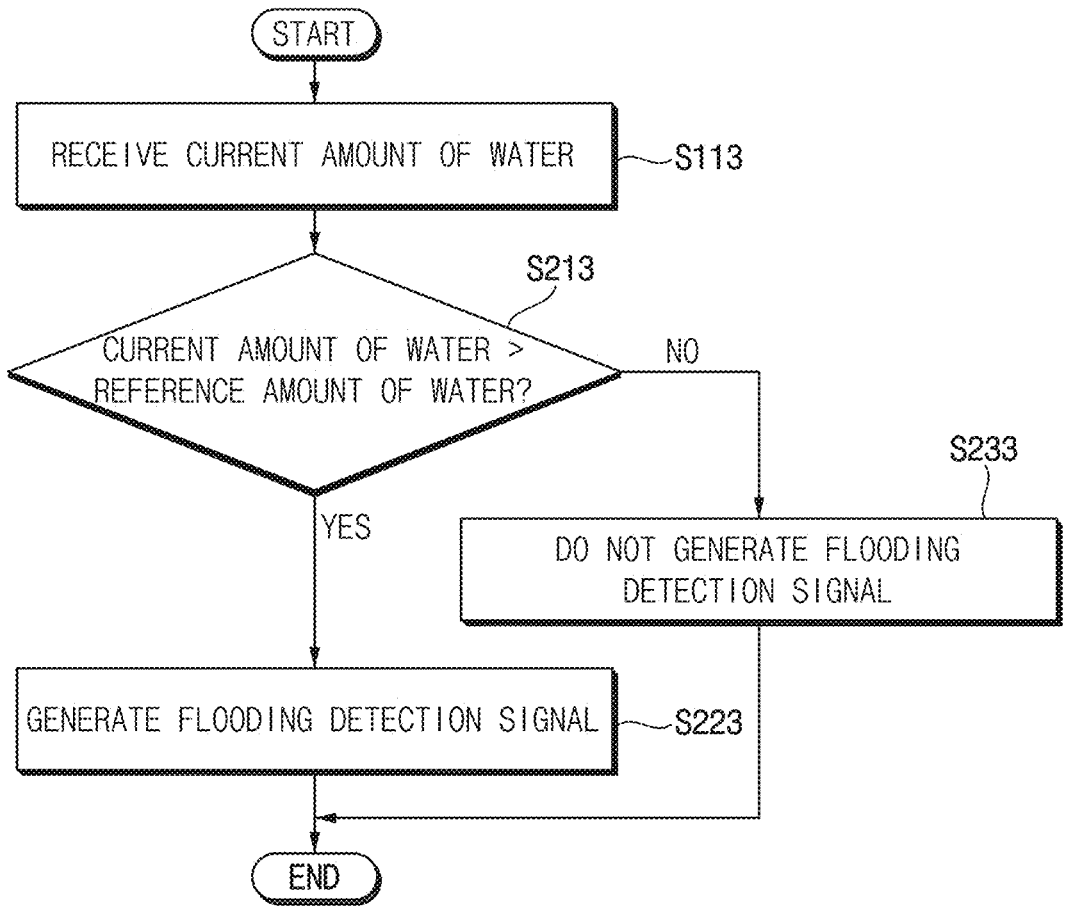
FIG. 9 is a flowchart illustrating examples of receiving environment information and selectively generating an event detection signal in FIG. 2.
Figure 10:
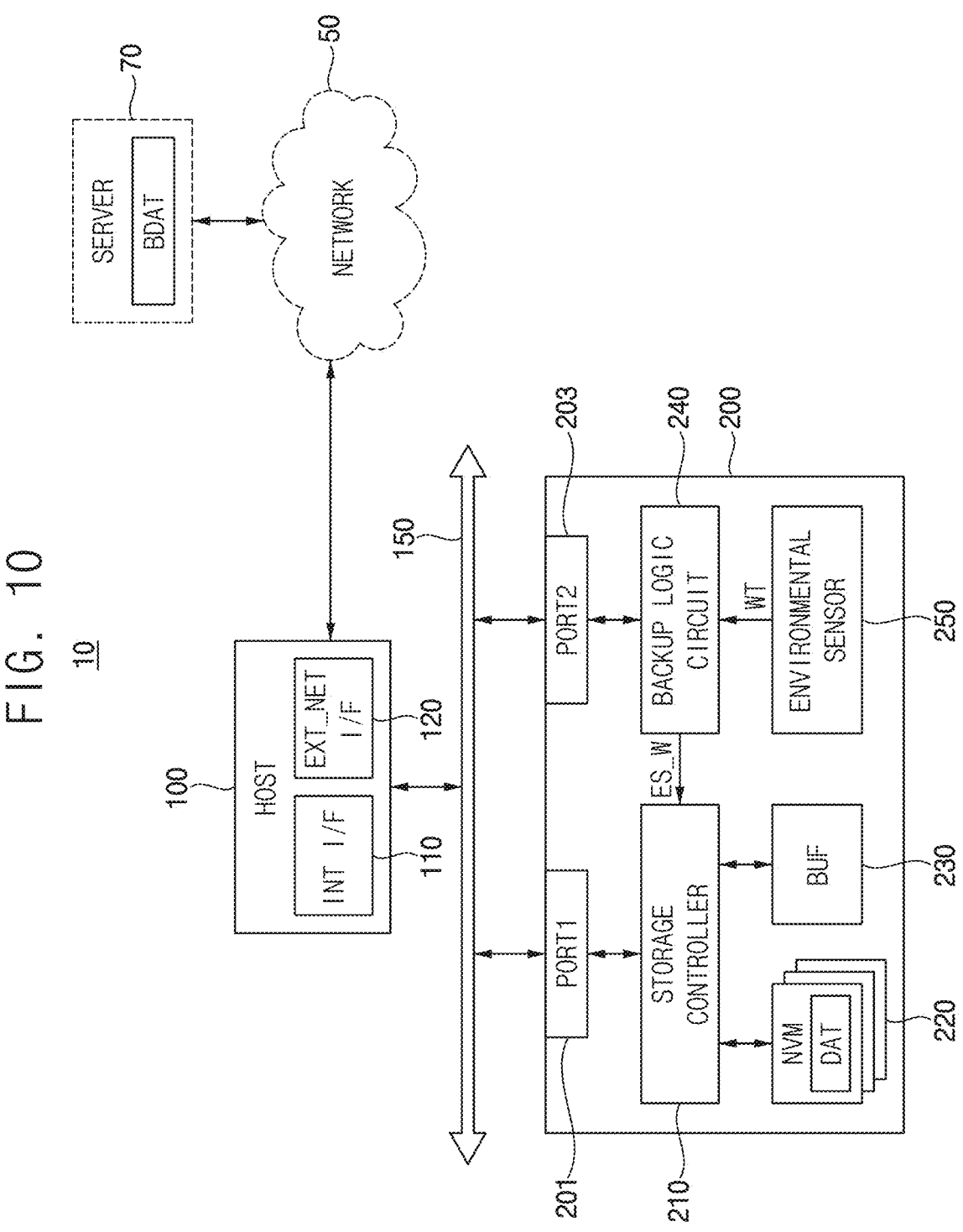
FIG. 10 is a diagram for describing an operation of FIG. 9.

FIG. 9 is a flowchart illustrating examples of receiving environment information and selectively generating an event detection signal in FIG. 2. FIG. 10 is a diagram for describing an operation of FIG. 9.

Referring to FIGS. 2, 6, 9 and 10, when receiving the environment information from the environmental sensor (operation S110), the backup logic circuit 240 may periodically receive the current humidity and/or amount of water WT in the operating environment of the storage device 200 from the water sensor 720 (operation S113). The water sensor 720 may be referred to as a flooding detection sensor.

When selectively generating the event detection signal based on the environment information (operations S210, S220 and S230), the current amount of water WT may be compared with the reference amount of water (operation S213). When the current amount of water WT becomes larger than the reference amount of water (operation S213: YES), the backup logic circuit 240 may generate a flooding detection signal ES_W representing that flooding has occurred (operation S223), and may provide the flooding detection signal ES_W to the storage controller 210. When the current amount of water WT is less than or equal to the reference amount of water (operation S213: NO), the backup logic circuit 240 may not generate the flooding detection signal ES_W (operation S233).

Figure 11:
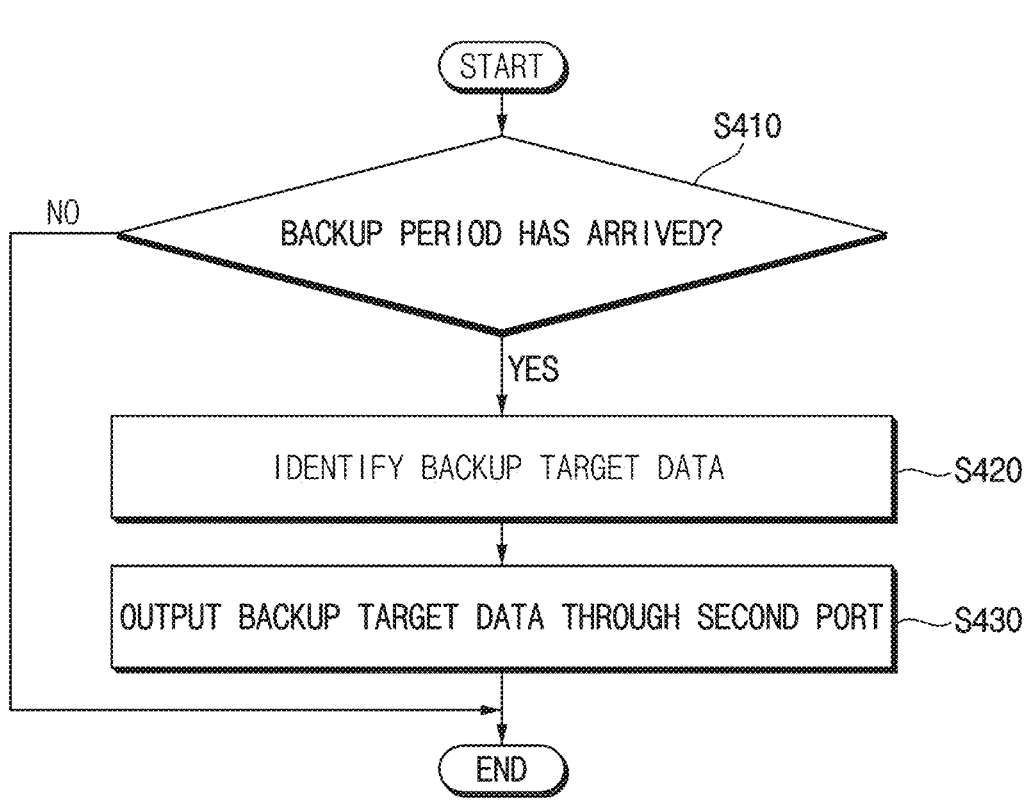
FIG. 11 is a flowchart illustrating an example of periodically outputting at least second data among a plurality of data in FIG. 2.
Figure 12:
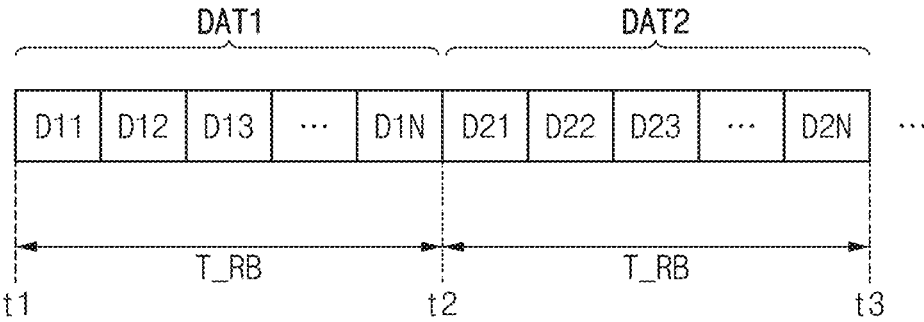
FIGS. 12 and 13 are diagrams for describing an operation of FIG. 11.
Figure 13:
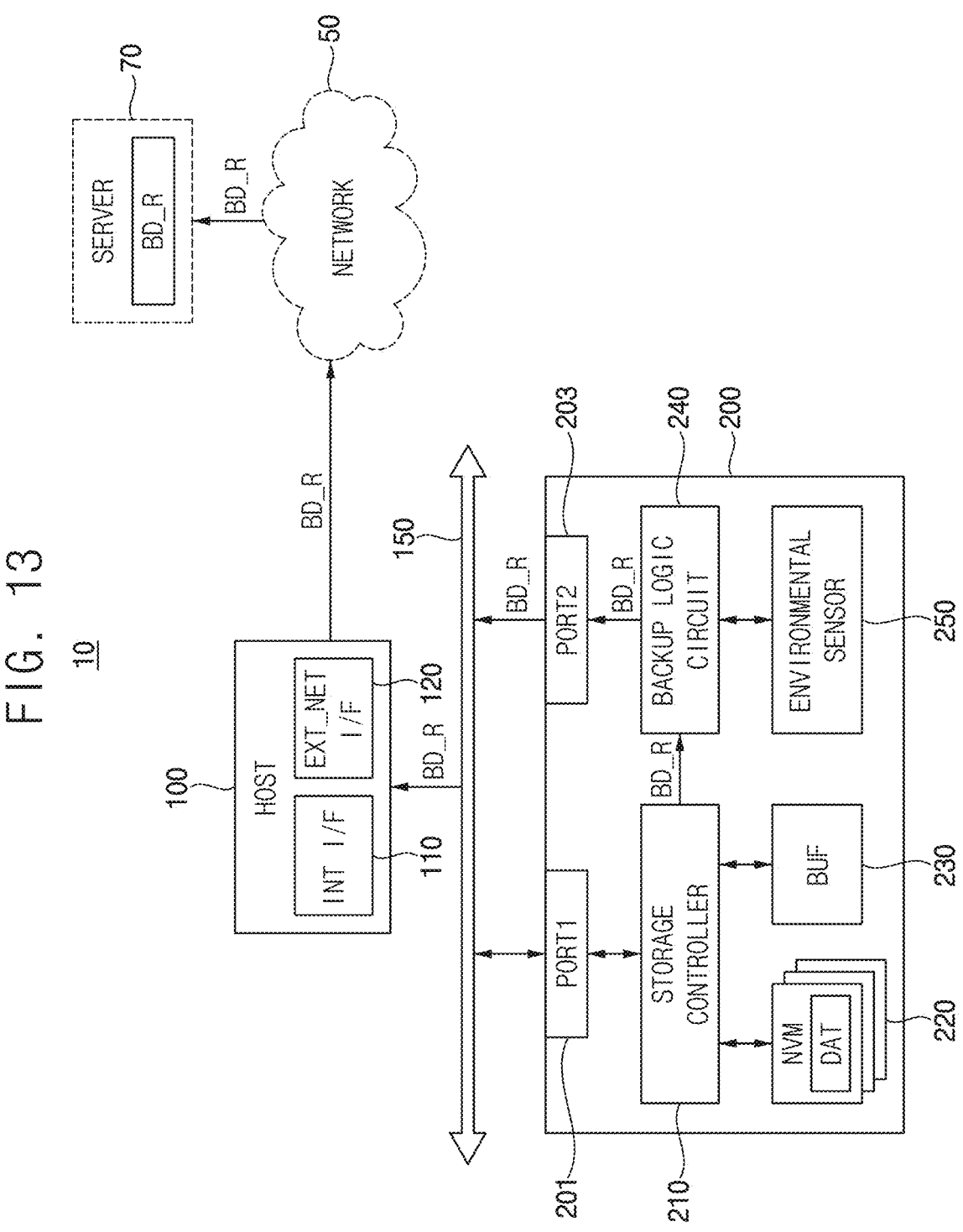

FIG. 11 is a flowchart illustrating an example of periodically outputting at least second data among a plurality of data in FIG. 2. FIGS. 12 and 13 are diagrams for describing an operation of FIG. 11.

Referring to FIGS. 2, 11, 12 and 13, when periodically outputting the at least second data among the plurality of data in response to non-generating the event detection signal (operation S400), backup target data BD_R among the plurality of data DAT stored in the storage device 200 may be periodically output every desired and/or alternatively predetermined backup period (or cycle) T_RB, and the backup target data BD_R that are periodically output may be transmitted to the server 70 and may be stored in the server 70.

For example, when the event detection signal is not generated (operation S230), it may be checked whether the backup period T_RB has arrived (operation S410). When the backup period T_RB arrives (operation S410: YES), the backup logic circuit 240 may identify the backup target data BD_R among the plurality of data DAT, (operation S420) and may output the backup target data BD_R through the second port 203 (operation S430). The backup target data BD_R may be transmitted to and stored in the server 70 through the external network interface 120 and the network 50. The backup target data BD_R may be referred to as regular backup data.

As illustrated in FIG. 12, the plurality of data DAT may be generated, collected, and stored by the lapse of time. For example, data D11, D12, D13, . . . , D1N may be sequentially generated and collected from a first time point t1, which is at the beginning of operation or an initial operation time, and the data D11 to D1N may be sequentially stored in the nonvolatile memories 220. At a second time point t2 which has elapsed by the backup period T_RB from the first time point t1, the data D11 to D1N that are generated and collected from the first time point t1 to the second time point t2 may be output as first regular backup data DAT1, and the first regular backup data DAT1 may be transmitted to and stored in the server 70. After the data backup operation is performed on the first regular backup data DAT1 at the second time point t2, data D21, D22, D23, . . . , D2N may be sequentially generated and collected from the second time point t2, and the data D21 to D2N may be sequentially stored in the nonvolatile memories 220. At a third time point t3 which has elapsed by the backup period T_RB from the second time point t2 at which the data backup operation is most recently performed, the data D21 to D2N that are generated and collected from the second time point t2 to the third time point t3 may be output as second regular backup data DAT2, and the second regular backup data DAT2 may be transmitted to and stored in the server 70.

For example, each of the first regular backup data DAT1 and the second regular backup data DAT2 in FIG. 12 may correspond to the backup target data BD_R in FIG. 13 and/or the at least second data of FIG. 2. The first regular backup data DAT1 and the second regular backup data DAT2 may be output at different time points, and may be transmitted to and stored in the server 70 at different time points. While the event detection signal is not generated, the above-described periodic backup operation may be continuously and repeatedly performed.

Although example embodiments are described based on that the data backup operation of S400 is regularly performed whenever the backup period T_RB arrives, example embodiments are not limited thereto. For example, the data backup operation of S400 may be performed when the operation of the storage system 10 is terminated, e.g., when the autonomous vehicle is powered off, or may be performed in a desired and/or alternatively predetermined situation other than the emergency situation.

Figure 14:
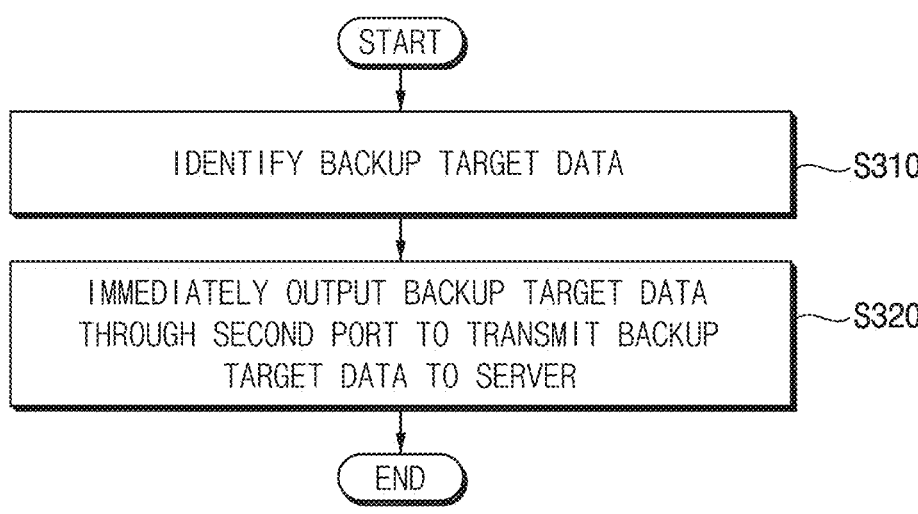
FIG. 14 is a flowchart illustrating an example of immediately outputting at least first data among a plurality of data in FIG. 2.
Figure 15:
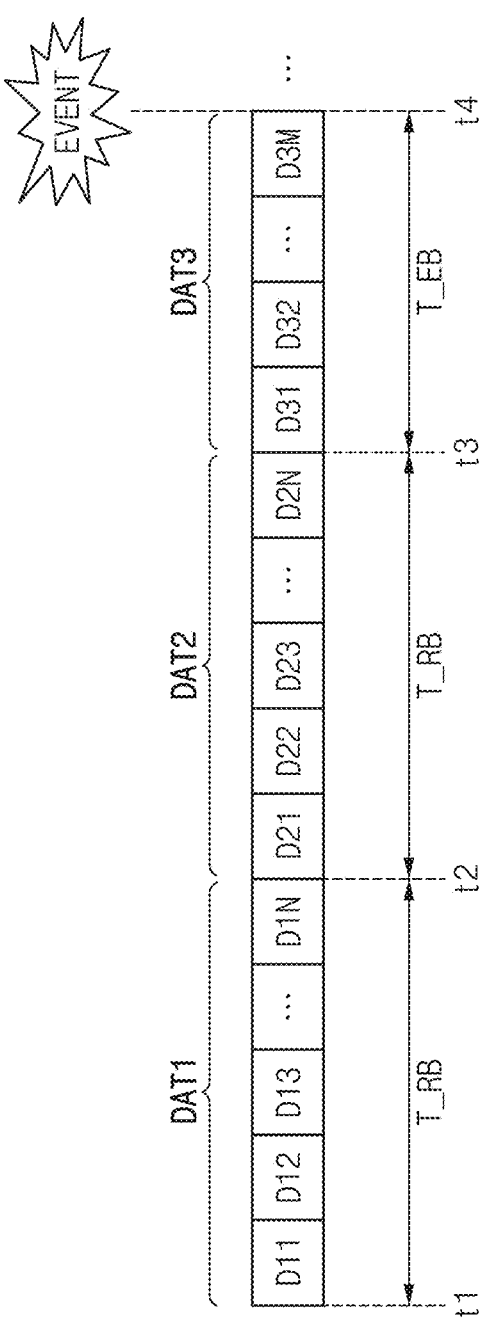
FIGS. 15 and 16 are diagrams for describing an operation of FIG. 14.
Figure 16:
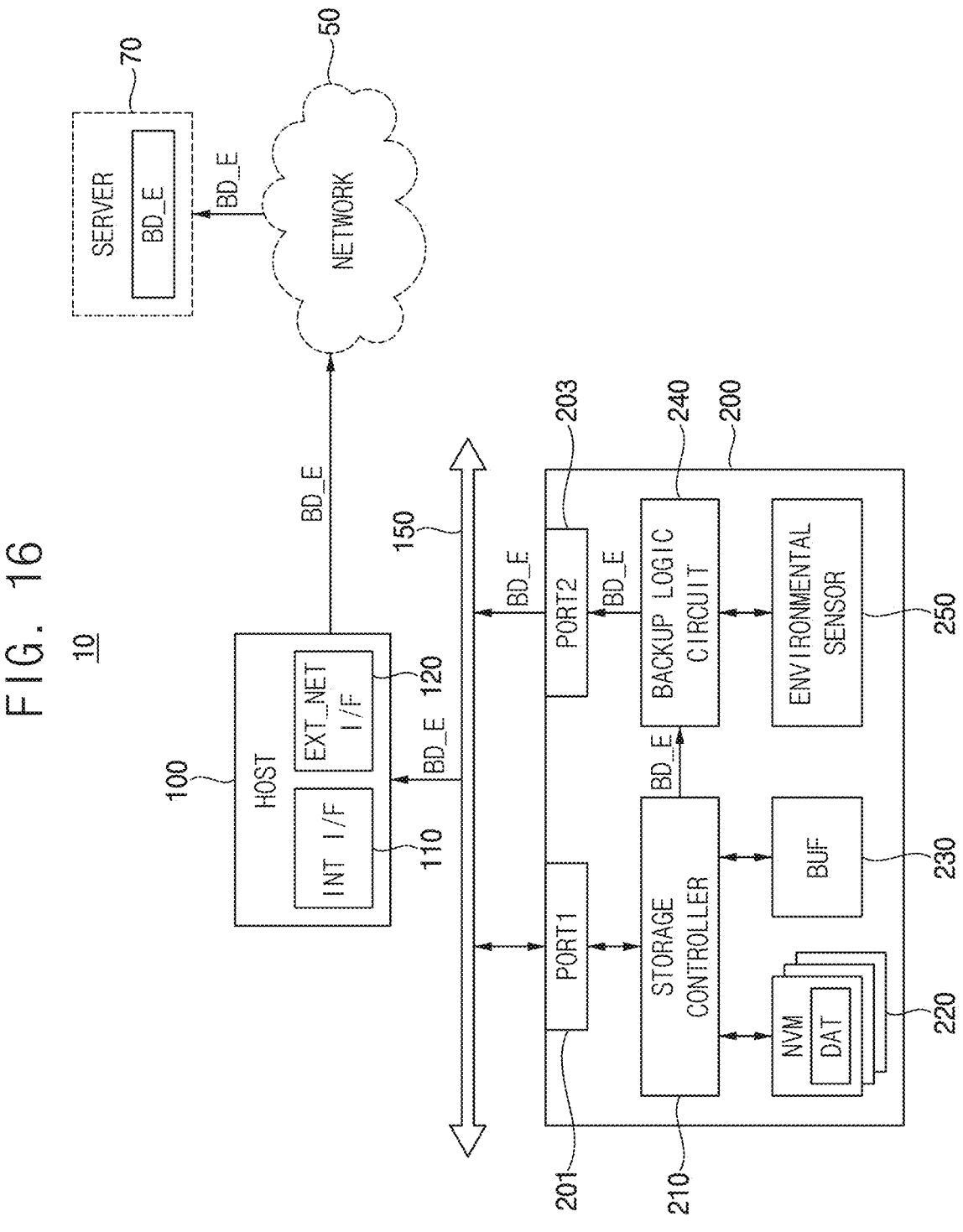

FIG. 14 is a flowchart illustrating an example of immediately outputting at least first data among a plurality of data in FIG. 2. FIGS. 15 and 16 are diagrams for describing an operation of FIG. 14.

Referring to FIGS. 2, 14, 15 and 16, when immediately outputting the at least first data among the plurality of data in response to generating the event detection signal (operation S300), the backup logic circuit 240 may identify backup target data BD_E among the plurality of data DAT stored in the storage device 200 (operation S310), and may immediately output the backup target data BD_E through the second port 203 (operation S320). Operations S310 and S320 in FIG. 14 may be the same as and/or substantially similar to operations S420 and S430 in FIG. 11, respectively. In operation S320, the backup target data BD_E may be transmitted to and stored in the server 70 through the external network interface 120 and the network 50. The backup target data BD_E may be referred to as emergency backup data.

As illustrated in FIG. 15, the plurality of data DAT may be generated, collected and stored by the lapse of time. Operations from the first time point t1 to the third time point t3 in FIG. 15 may be substantially the same as those described with reference to FIG. 12. After the data backup operation is performed on the second regular backup data DAT2 at the third time point t3, data D31, D32, . . . , D3M may be sequentially generated and collected from the third time point t3, and the data D31 to D3M may be sequentially stored in the nonvolatile memories 220. At a fourth time point t4 before the backup period T_RB elapses from the third time point t3 at which the data backup operation is most recently performed, the emergency situation such as fire or flooding may occur, and the event detection signal may be generated. At the fourth time point t4 at which the emergency situation occurs, the data D31 to D3M that are generated and collected from the third time point t3 at which the data backup operation is most recently performed to the fourth time point t4 may be immediately output as first emergency backup data DAT3, and the first emergency backup data DAT3 may be transmitted to and stored in the server 70.

For example, the first emergency backup data DAT3 in FIG. 15 may correspond to the backup target data BD_E in FIG. 16 and/or the first data in FIG. 2. When the event detection signal is generated, the above-described emergency backup operation may be performed, and the process may be terminated.

In some example embodiments, the emergency situation may occur at the fourth time point t4 before the backup period T_RB elapsed from the third time point t3, and thus a time interval T_EB from the third time point t3 to the fourth time point t4 may be shorter than the backup period T_RB. In addition, the amount (or quantity) of the first emergency backup data DAT3 may be smaller than the amount of each of the first and second regular backup data DAT1 and DAT2. For example, when the number of the data D11 to D1N is N, when the number of the data D21 to D2N is N, and when the number of the data D31 to D3M is M, M may be smaller than N, where each of N and M is a positive integer.

Figure 17:
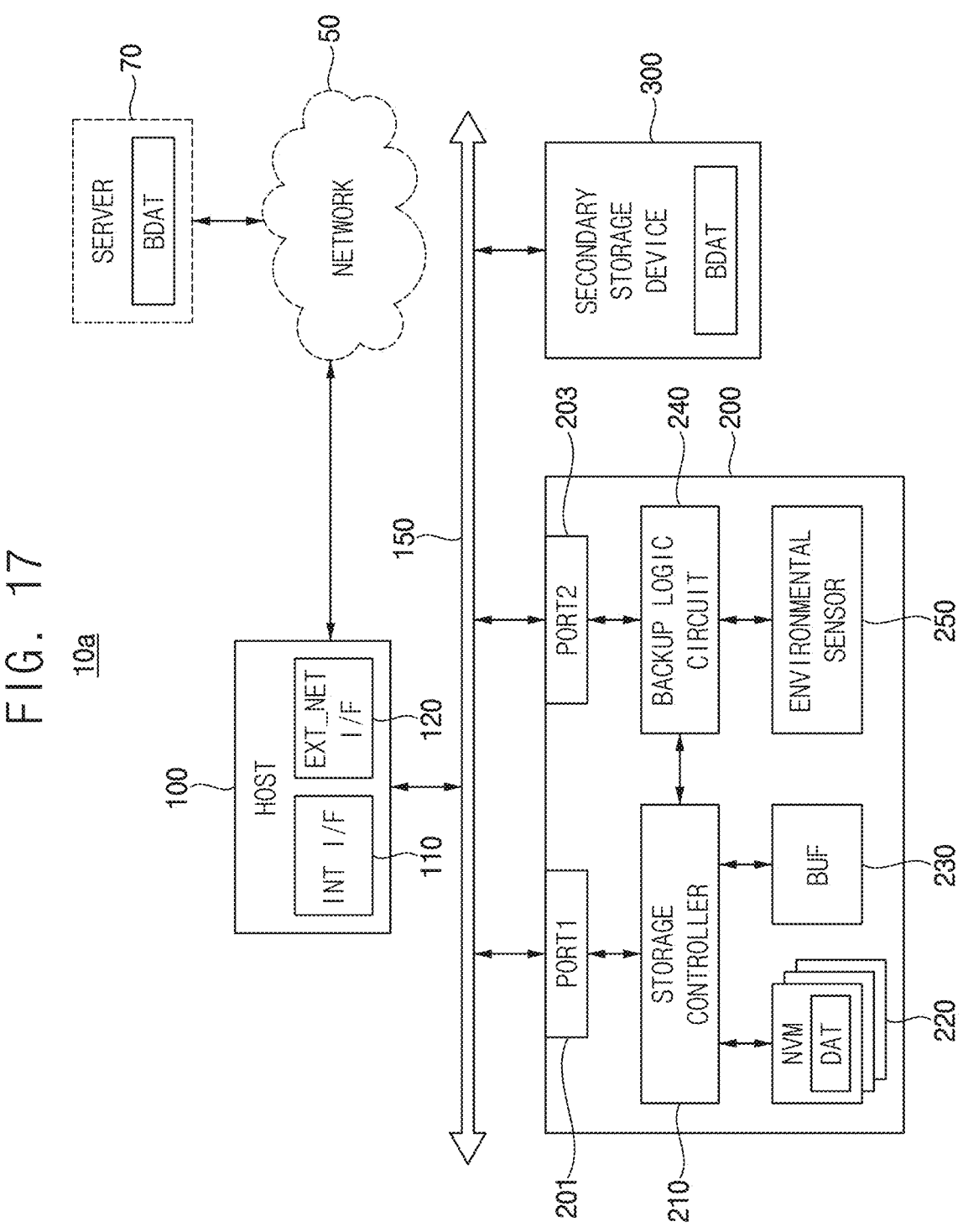
FIG. 17 is a block diagram illustrating a storage device and a storage system including the storage device according to some example embodiments.

FIG. 17 is a block diagram illustrating a storage device and a storage system including the storage device according to example embodiments. The descriptions repeated with FIG. 3 will be omitted for brevity.

Referring to FIG. 17, a storage system 10a includes a host 100, a system bus 150, a storage device 200, and a secondary storage device (or auxiliary storage device) 300.

The storage system 10a of FIG. 17 may be the same as and/or substantially similar to the storage system 10 of FIG. 3, except that the storage system 10a further includes the secondary storage device 300.

The secondary storage device 300 may store at least some (e.g., the backup target data BDAT) of the plurality of data DAT under a control of the backup logic circuit 240. FIG. 17 illustrates an example where the backup target data BAT is stored in and/or backed up to at least one of the server 70 and the secondary storage device 300. Although not illustrated in detail, the secondary storage device 300 may have a configuration similar to that of the storage device 200, and may include, for example, a storage controller, a plurality of nonvolatile memories and a buffer memory.

The storage device 200 and the secondary storage device 300 may be physically different storage devices. In some example embodiments, both the storage device 200 and the secondary storage device 300 may be disposed or located in the same space (e.g., in the first space). For example, when the storage system 10a is the autonomous driving system, both the storage device 200 and the secondary storage device 300 may be inside the autonomous vehicle including the autonomous driving system. For example, to increase preservability of data, the secondary storage device 300 may be installed at a location far enough away from the storage device 200, may not be used in a normal operating situation, and/or may be used only when the emergency situation occurs.

Although FIG. 17 illustrates an example where the storage system 10a includes only one secondary storage device 300, the example embodiments are not limited thereto, and the number of secondary storage devices included in the storage system may be variously determined. For example, the storage system 10a may include one or more secondary storage devices 300.

Figure 18:
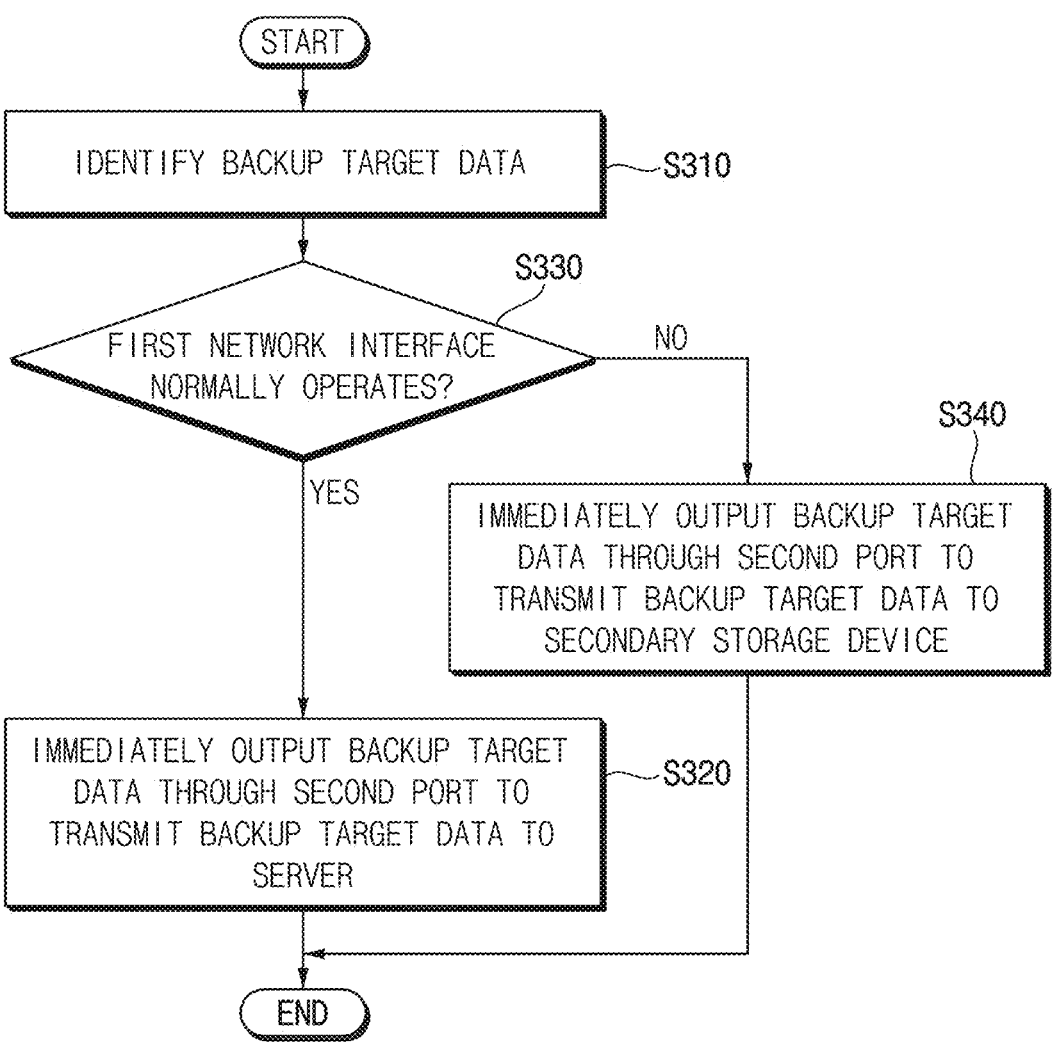
FIG. 18 is a flowchart illustrating an example of immediately outputting at least first data among a plurality of data in FIG. 2.
Figure 19:
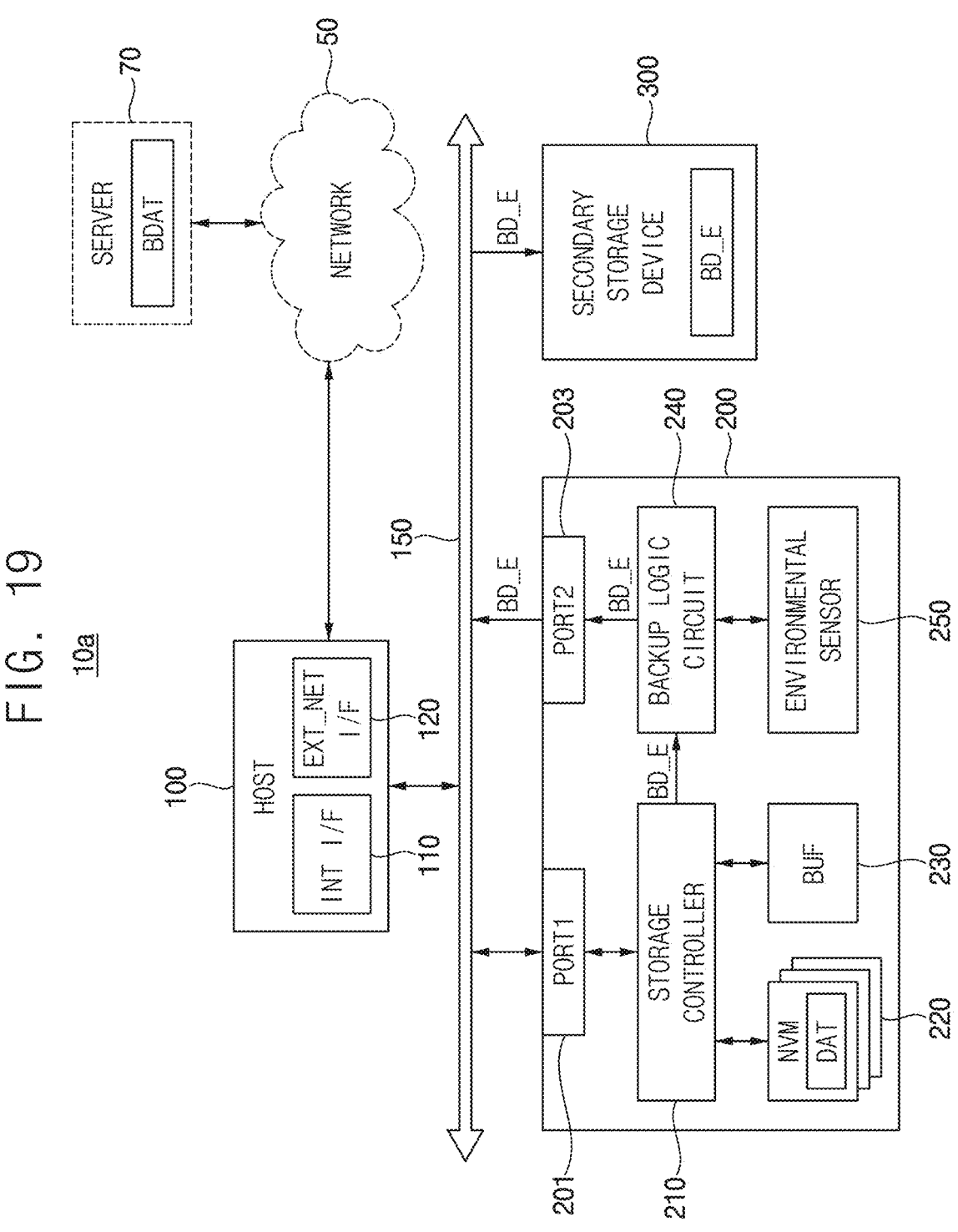
FIG. 19 is a diagram for describing an operation of FIG. 18.

FIG. 18 is a flowchart illustrating an example of immediately outputting at least first data among a plurality of data in FIG. 2. FIG. 19 is a diagram for describing an operation of FIG. 18. The descriptions repeated with FIGS. 14, 15 and 16 will be omitted for brevity.

Referring to FIGS. 2, 18 and 19, when immediately outputting the at least first data among the plurality of data in response to generating the event detection signal (operation S300), operation S310, which is substantially the same as that described with reference to FIG. 14, may be performed.

Thereafter, it may be checked whether a first network interface normally operates (operation S330). The first network interface may be located outside the storage device 200. For example, the first network interface may be the external network interface 120 that is included in the host 100 and is used for the external communication of the storage system 10a through the network 50.

When it is determined that the first network interface normally operates (operation S330: YES), operation S320, which is substantially the same as that described with reference to FIG. 14, may be performed.

When it is determined that the first network interface abnormally operates (operation S330: NO), e.g., when a communication with the server 70 through the external network interface 120 and the network 50 is not normally performed, the backup target data BD_E may be immediately output through the second port 203 (operation S340). In operation S340, the backup target data BD_E may be transmitted to and stored in the secondary storage device 300 outside the storage device 200. Therefore, even when the external communication through the external network interface 120 is not normally performed, the backup target data BD_E may be efficiently preserved. In at least one embodiment, the storage system 10a may be configured to automatically transmit and store the backup target data BD_E stored in the secondary storage device 300 to the server 70 when the connection to the network 50 is reestablished.

Figure 20:
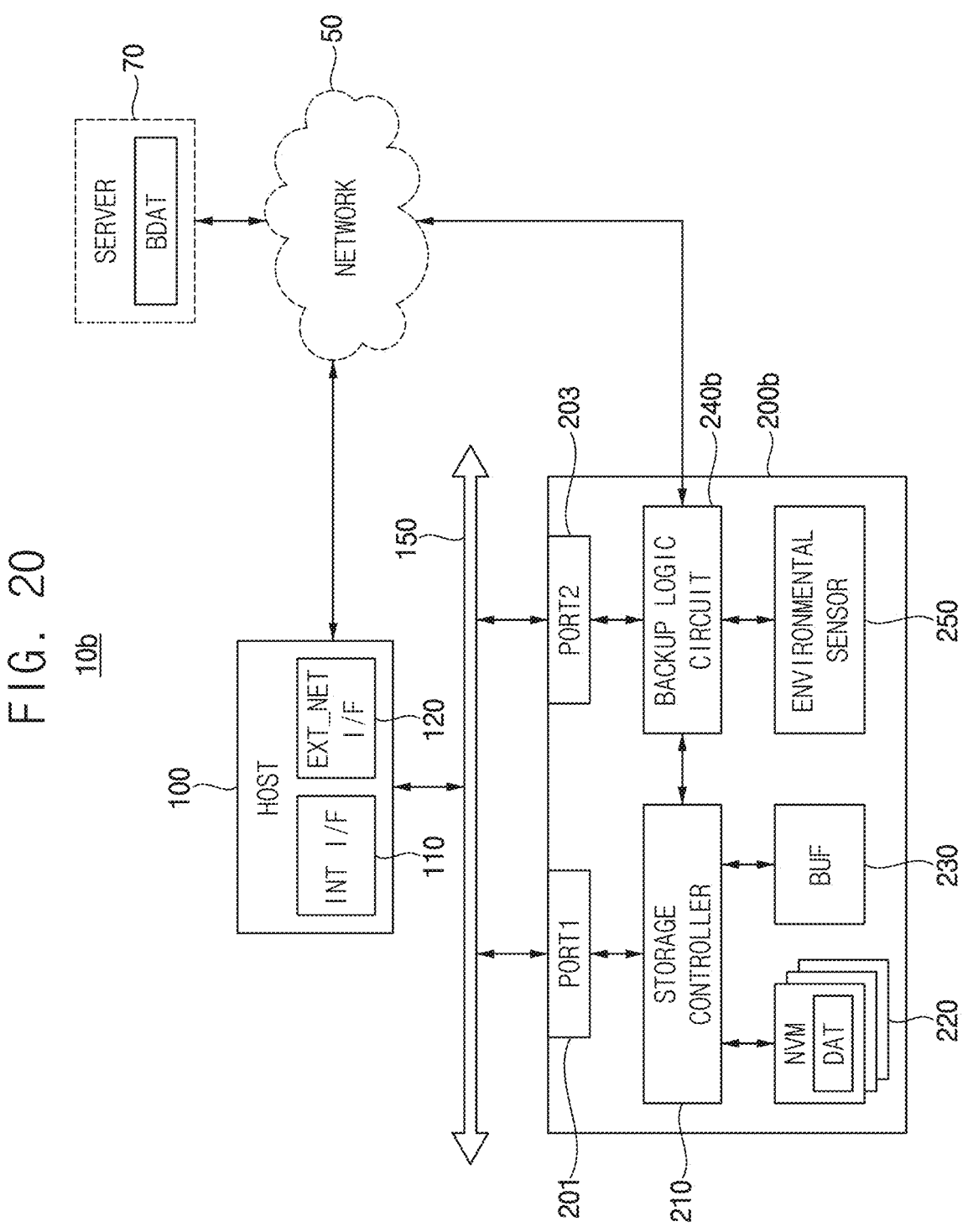
FIG. 20 is a block diagram illustrating a storage device and a storage system including the storage device according to some example embodiments.
Figure 21:
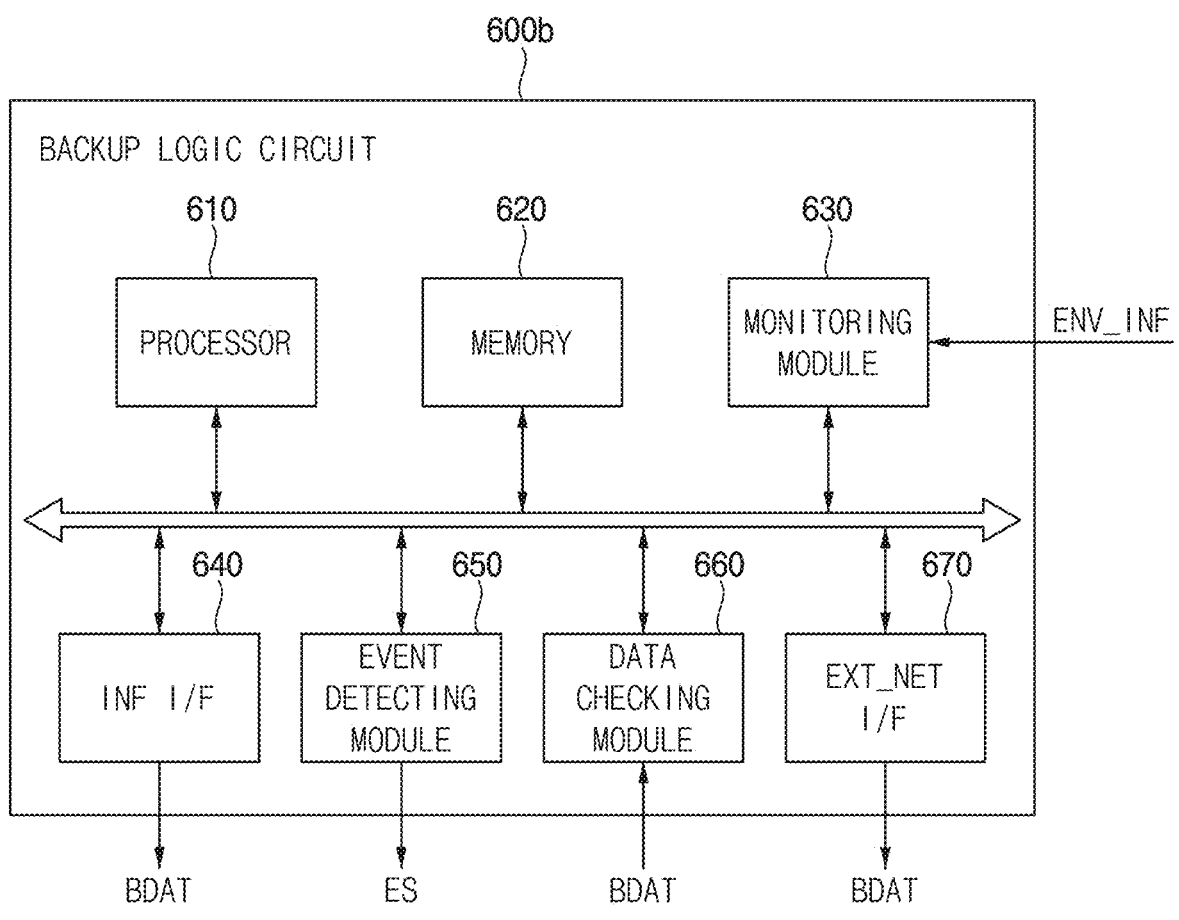
FIG. 21 is a block diagram illustrating an example of a backup logic circuit included in a storage device according to some example embodiments.

FIG. 20 is a block diagram illustrating a storage device and a storage system including the storage device according to some example embodiments. FIG. 21 is a block diagram illustrating an example of a backup logic circuit included in a storage device according to example embodiments. The descriptions repeated with FIGS. 3 and 6 will be omitted for brevity.

Referring to FIG. 20, a storage system 10b includes a host 100, a system bus 150 and a storage device 200b.

The storage system 10b of FIG. 20 may be substantially the same as and/or substantially similar to the storage system 10 of FIG. 3, except that a backup logic circuit 240b included in the storage device 200b is partially changed.

The storage device 200b and the backup logic circuit 240b included in the storage device 200b may be implemented to perform the external communication through the network 50 without using the host 100 and the external network interface 120 included in the host 100.

Referring to FIG. 21, a backup logic circuit 600b may include a processor 610, a memory 620, a monitoring module 630, an internal interface 640, an event detecting module 650, a data checking module 660 and an external network interface 670.

The backup logic circuit 600b of FIG. 21 may be the same as (and/or substantially similar to) the backup logic device 240b of FIG. 20, and may be substantially the same as the backup logic circuit 600 of FIG. 6, except that the backup logic circuit 600b further includes the external network interface 670.

The external network interface 670 may be used for the external communication through the network 50. The external network interface 670 may be similar to the external network interface 120 included in the host 100. For example, the external network interface 670 may provide an interface for the data backup operation based on a wireless mobile communication protocol such as a 3G communication, a 4G communication, an LTE communication, a 5G communication, and/or the like, and may output the backup target data BDAT.

Figure 22:
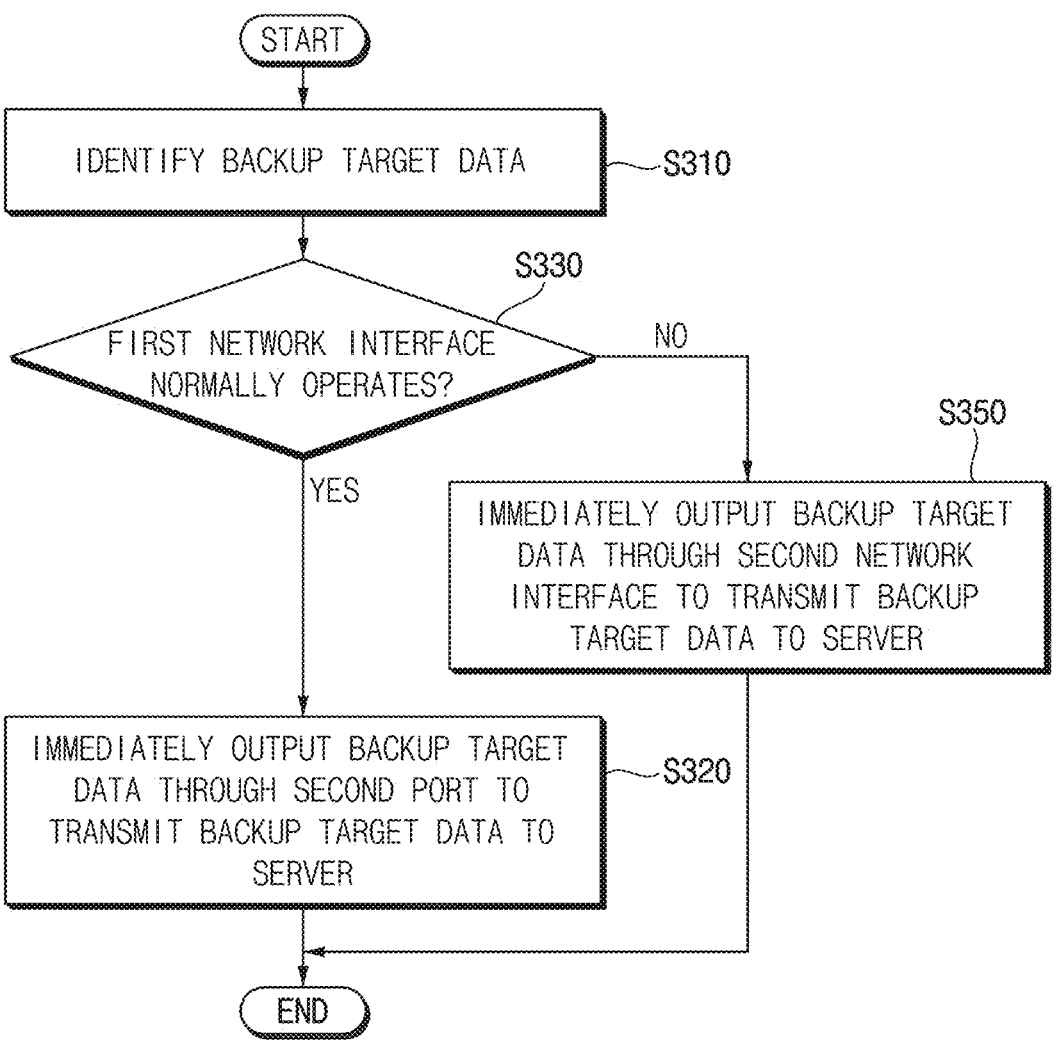
FIG. 22 is a flowchart illustrating an example of immediately outputting at least first data among a plurality of data in FIG. 2.
Figure 23:
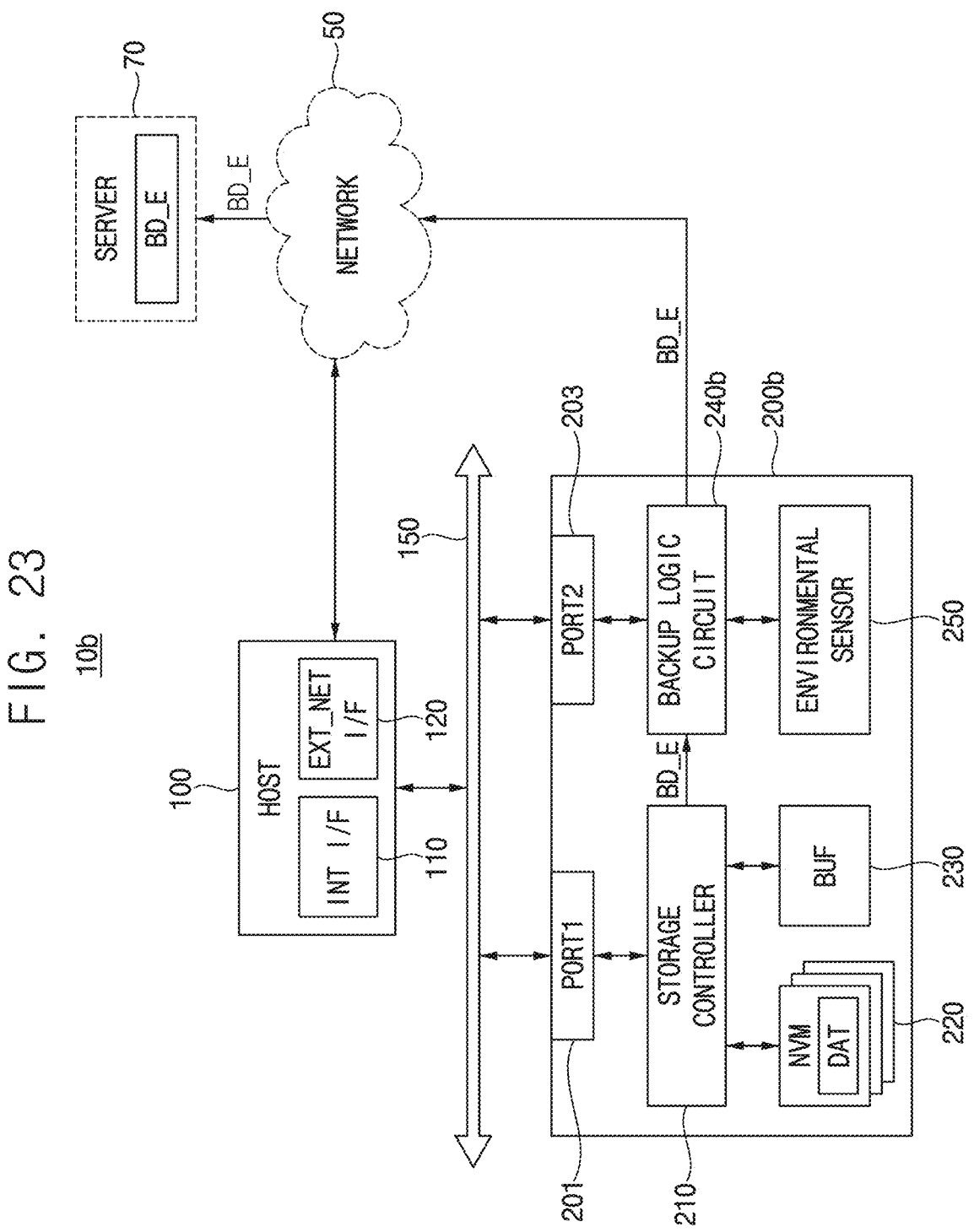
FIG. 23 is a diagram for describing an operation of FIG. 22.

FIG. 22 is a flowchart illustrating an example of immediately outputting at least first data among a plurality of data in FIG. 2. FIG. 23 is a diagram for describing an operation of FIG. 22. The descriptions repeated with FIGS. 14, 15, 16, 18 and 19 will be omitted for brevity.

Referring to FIGS. 2, 22 and 23, when immediately outputting the at least first data among the plurality of data in response to generating the event detection signal (operation S300), operations S310, S320 and S330 may be substantially the same as those described with reference to FIGS. 14 and 18.

When it is determined that the first network interface abnormally operates (operation S330: NO), e.g., when the communication with the server 70 through the external network interface 120 and the network 50 is not normally performed, the backup target data BD_E may be output through a second network interface (operation S350). The second network interface may be located inside the storage device 200b. For example, the second network interface may be the external network interface 670 included in the backup logic circuit 240b. In operation S350, the backup target data BD_E may be transmitted to and stored in the server 70 through the second network interface and the network 50. Therefore, even when the external communication through the external network interface 120 is not normally performed, the backup target data BD_E may be efficiently preserved.

Figure 24:
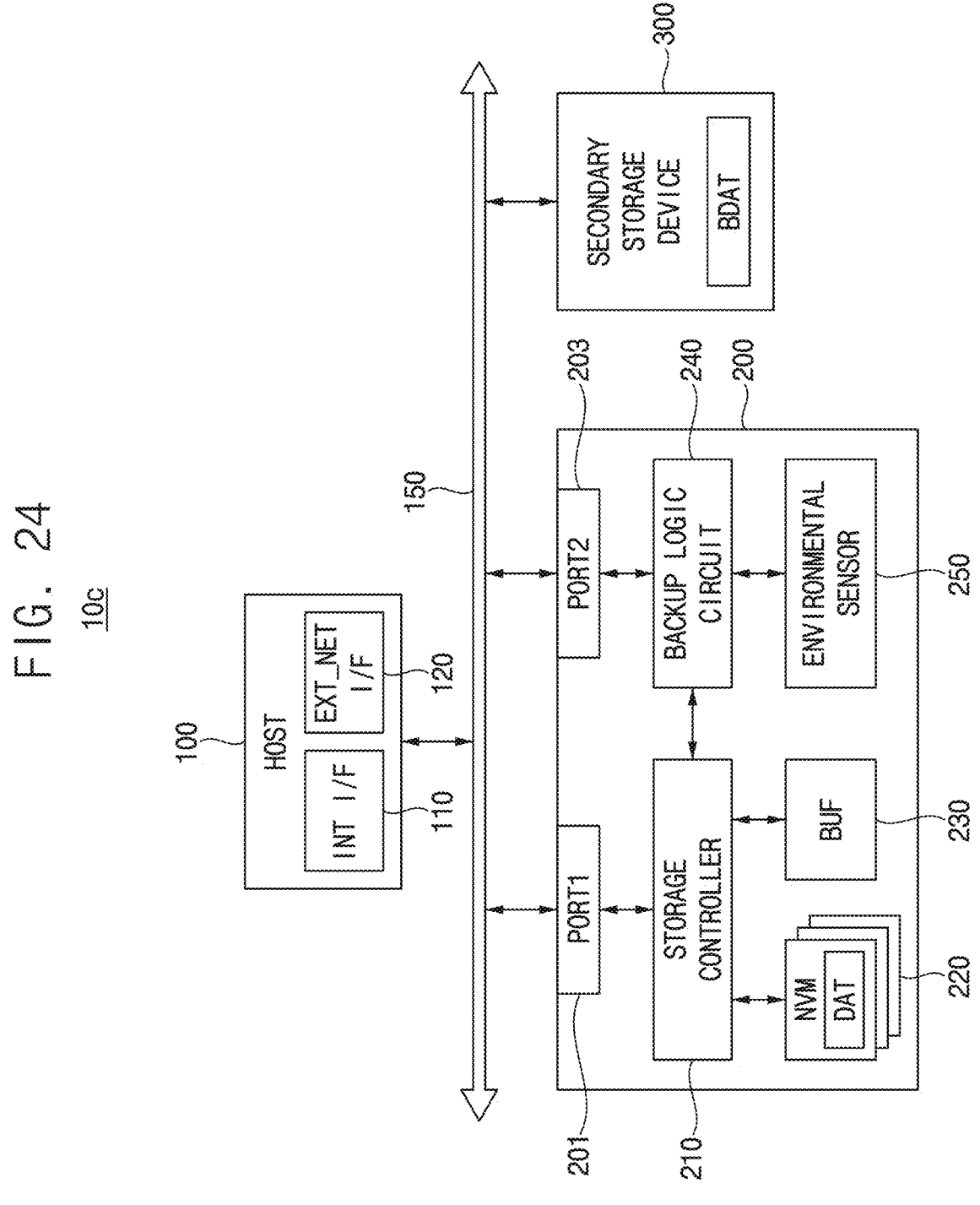
FIG. 24 is a block diagram illustrating a storage device and a storage system including the storage device according to some example embodiments.

FIG. 24 is a block diagram illustrating a storage device and a storage system including the storage device according to example embodiments. The descriptions repeated with FIGS. 3 and 17 will be omitted for brevity.

Referring to FIG. 24, a storage system 10c includes a host 100, a system bus 150, a storage device 200 and a secondary storage device 300.

The storage system 10c of FIG. 24 may be the same as and/or substantially similar to the storage system 10 of FIG. 3, except that the storage system 10c further includes the secondary storage device 300 and the network 50 and the server 70 are omitted. The secondary storage device 300 may be substantially the same as that described with reference to FIG. 17. FIG. 24 illustrates an example where the backup target data BDT is stored in or backed up to the secondary storage device 300.

Figure 25:
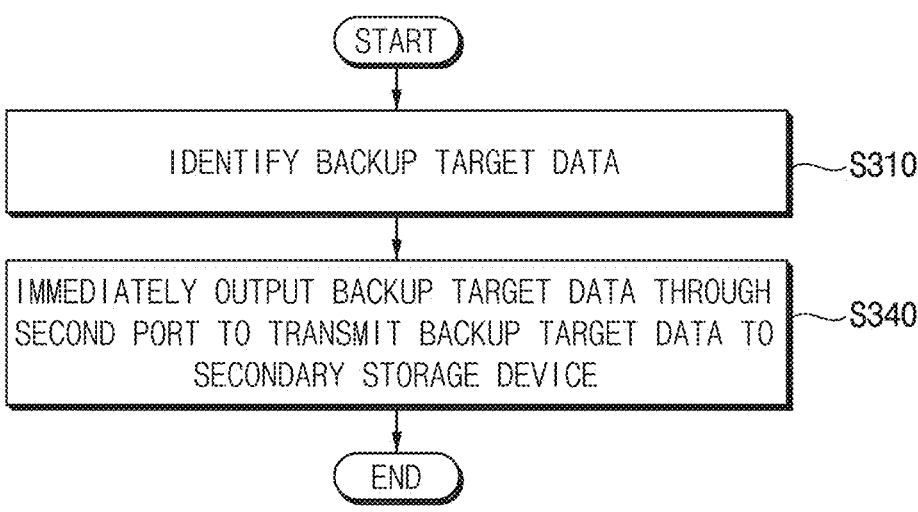
FIG. 25 is a flowchart illustrating an example of immediately outputting at least first data among a plurality of data in FIG. 2.

FIG. 25 is a flowchart illustrating an example of immediately outputting at least first data among a plurality of data in FIG. 2. The descriptions repeated with FIGS. 14, 15, 16, 18 and 19 will be omitted for brevity.

Referring to FIGS. 2 and 25, when immediately outputting the at least first data among the plurality of data in response to generating the event detection signal (operation S300), operations S310 and S340 may be substantially the same as those described with reference to FIGS. 14 and 18.

Figure 26:
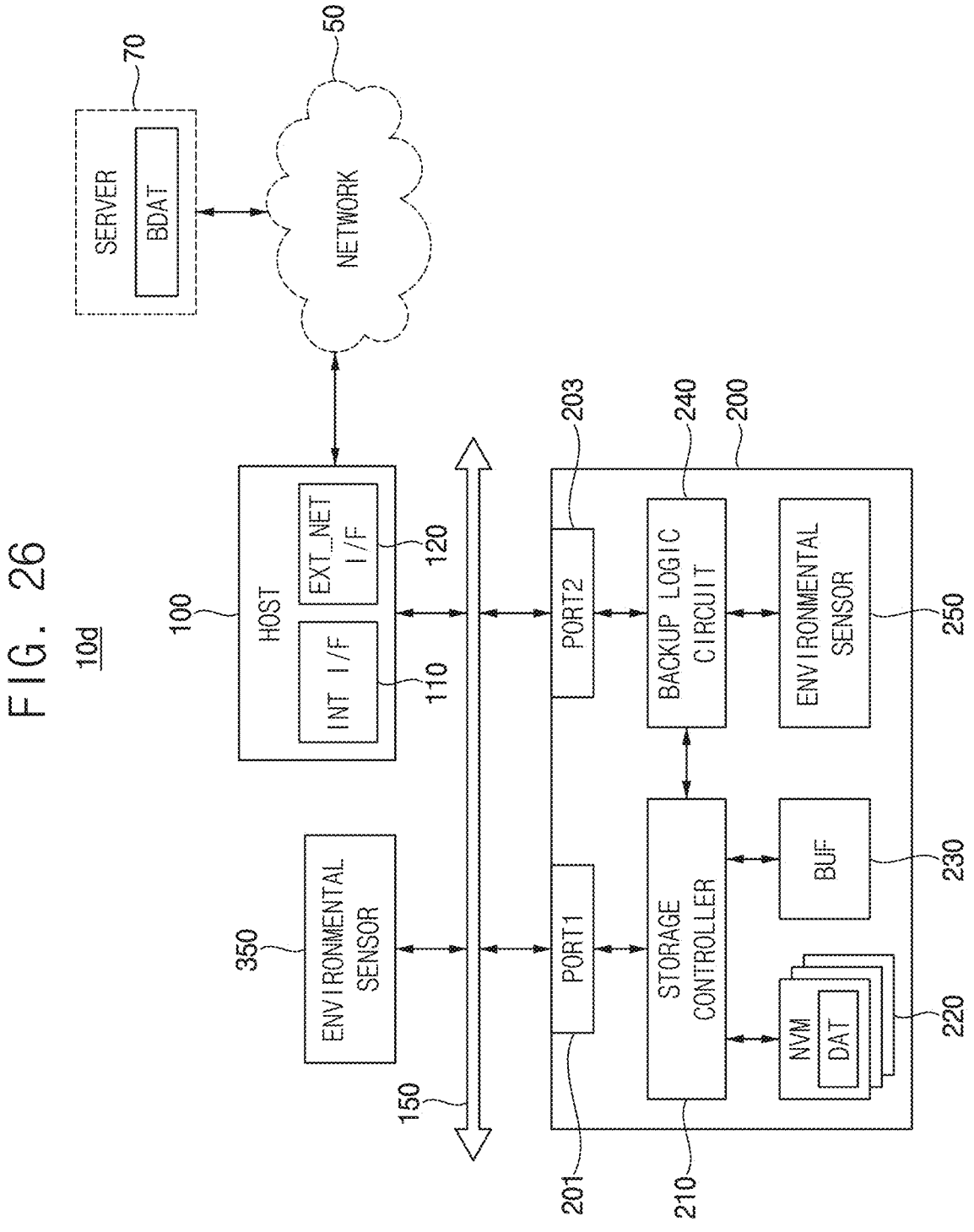
FIGS. 26, 27 and 28 are block diagrams illustrating a storage device and a storage system including the storage device according to some example embodiments.
Figure 27:
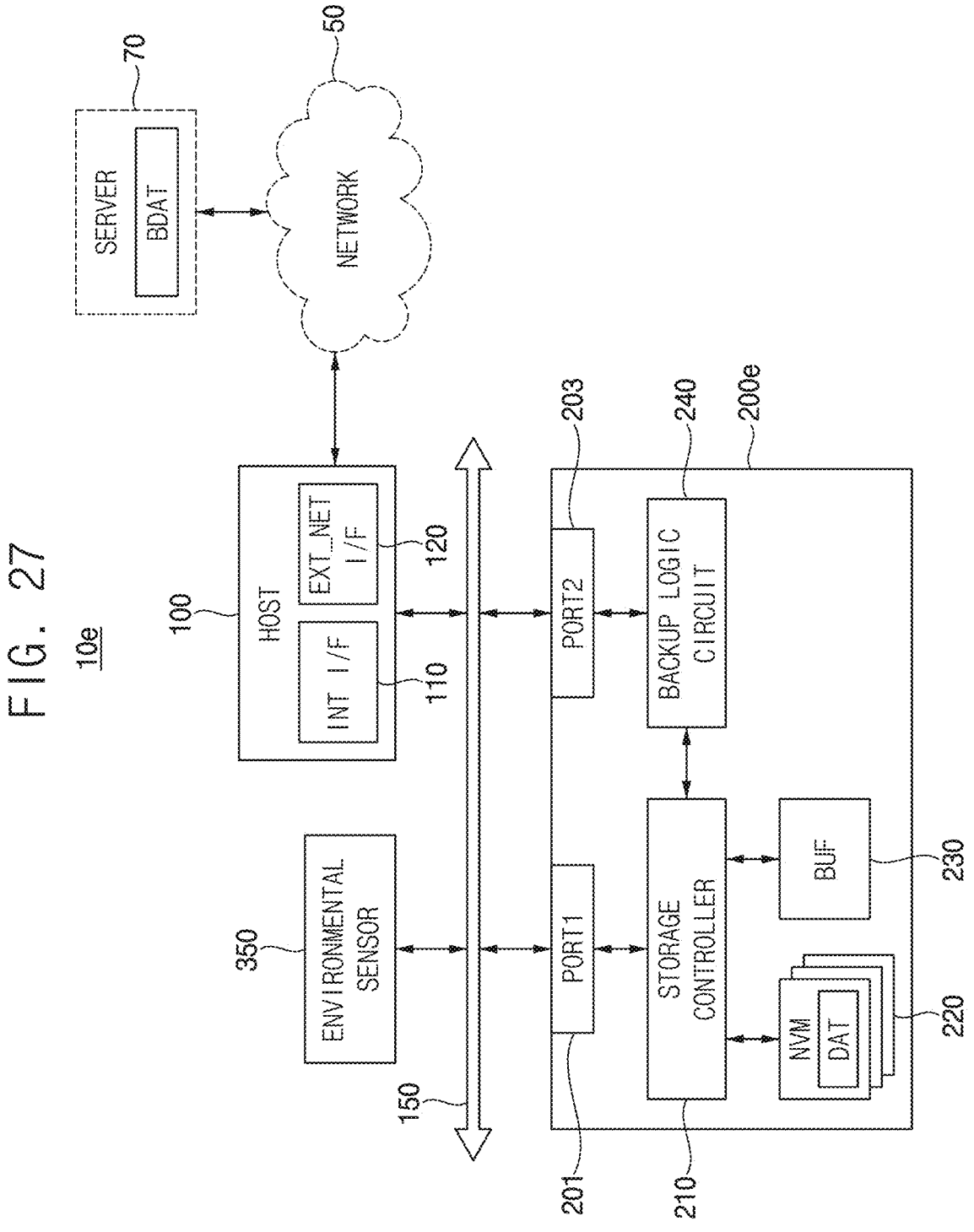
Figure 28:
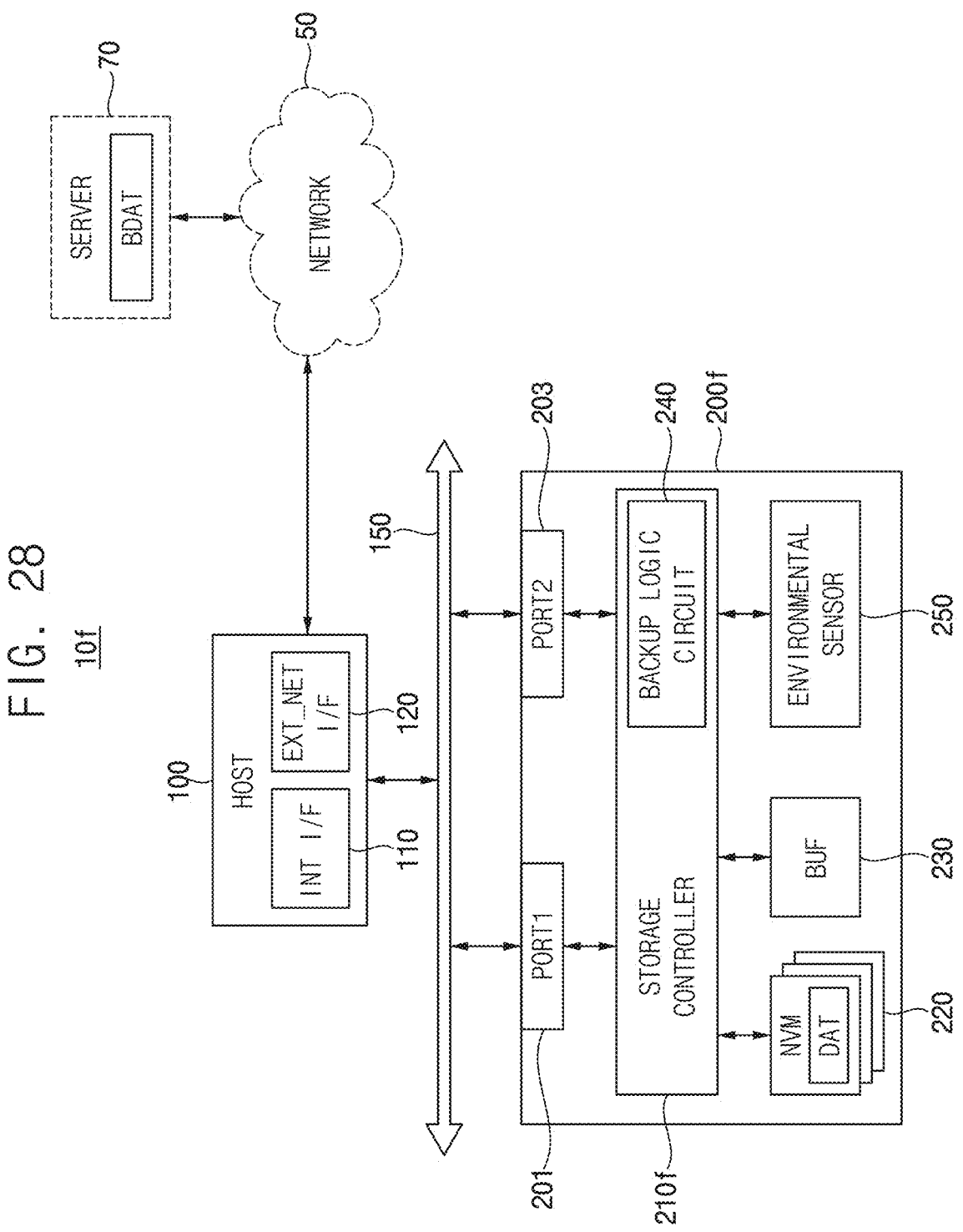

FIGS. 26, 27 and 28 are block diagrams illustrating a storage device and a storage system including the storage device according to some example embodiments. The descriptions repeated with FIG. 3 will be omitted for brevity.

Referring to FIG. 26, a storage system 10d includes a host 100, a system bus 150, a storage device 200 and an environmental sensor 350.

The storage system 10d of FIG. 26 may be substantially the same as the storage system 10 of FIG. 3, except that the storage system 10d further includes the environmental sensor 350 located outside the storage device 200.

The environmental sensor 350 may monitor the operating environment in which the storage device 200 and the storage system 10d are operating. The backup logic circuit 240 may communicate with the storage controller 210 and the environmental sensors 250 and 350, and may control the data backup operation of backing up the plurality of data DAT to the outside of the storage device 200. As with the environmental sensor 250, the environmental sensor 350 may include at least one of a temperature sensor, a mechanical sensor, a water sensor, and/or the like, and/or may further include at least one of various sensors. FIG. 26 illustrates an example where the environmental sensors 250 and 350 are disposed inside and outside the storage device 200.

For example, the backup logic circuit 240 may receive first environment information from the environmental sensor 250, may receive second environment information from the environmental sensor 350, and may check whether the emergency situation has occurred based on the first and second environment information. For example, the first environment information and the second environment information may include a first current temperature and a second current temperature, respectively. For example, the fire detection signal may be generated when both the first and second current temperatures become higher than the reference temperature. Alternatively, the fire detection signal may be generated even when only one of the first and second current temperatures becomes higher than the reference temperature.

Referring to FIG. 27, a storage system 10e includes a host 100, a system bus 150, a storage device 200e and an environmental sensor 350.

The storage system 10e of FIG. 27 may be the same as and/or substantially similar to the storage system 10 of FIG. 3, except that the storage system 10e further includes the environmental sensor 350 located outside the storage device 200e and the environmental sensor 250 located inside the storage device 200e is omitted. The environmental sensor 350 in FIG. 27 may be the same as and/or substantially similar to the environmental sensor 350 in FIG. 26. FIG. 27 illustrates an example where the environmental sensor 350 is disposed outside the storage device 200.

Referring to FIG. 28, a storage system 10f includes a host 100, a system bus 150 and a storage device 200f.

The storage system 10f of FIG. 28 may be the same as and/or substantially similar to the storage system 10 of FIG. 3, except that the backup logic circuit 240 included in the storage device 200f is located inside a storage controller 210f. Even when the backup logic circuit 240 is disposed inside the storage controller 210f, the first port 201 used to store the plurality of data DAT and the second port 203 used to output the backup target data BAT may be different from each other. For example, the path for the data storage operation and the path for the data backup operation may be formed independently, individually and/or separately in the storage device.

In some example embodiments, the storage system may be implemented by combining two or more of the storage systems 10a, 10b, 10c, 10d, 10e and 10f of FIGS. 17, 20, 24, 26, 27 and 28. For example, in the storage systems 10d, 10e and 10f of FIGS. 26, 27 and 28, the secondary storage device 300 may be added as in the example of FIG. 17, the backup logic circuit 240b may be changed as in the example of FIG. 20, and/or the network 50 and the server 70 may be omitted as in the example of FIG. 24. Alternatively, the storage system may be implemented by combining the examples in various manners.

Figure 29:
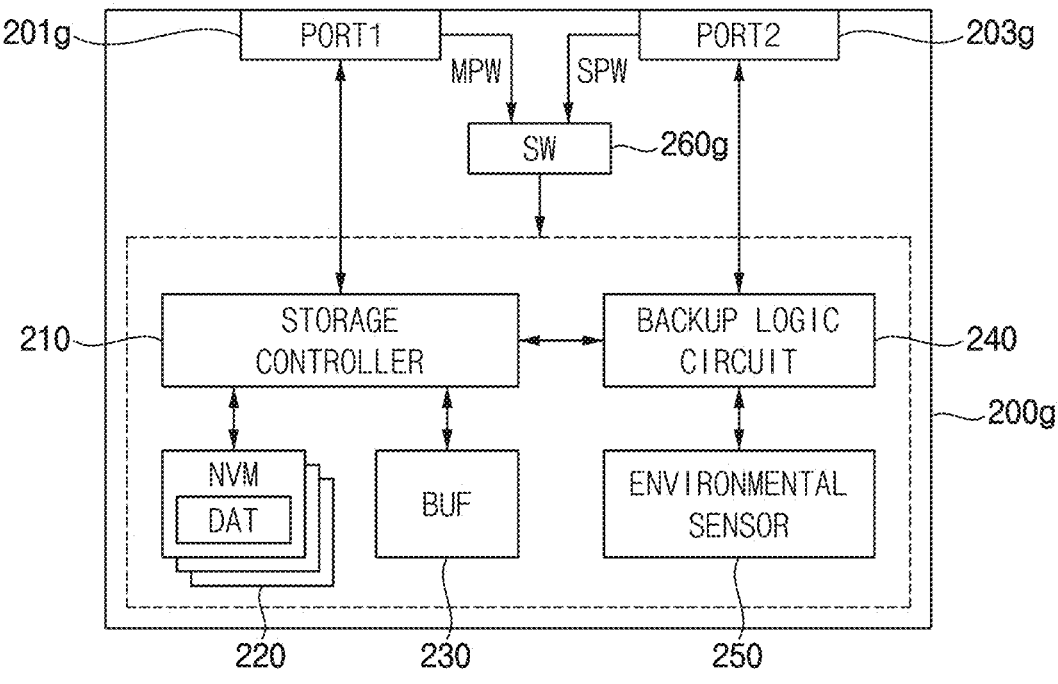
FIGS. 29 and 30 are block diagrams illustrating a storage device according to some example embodiments.
Figure 30:
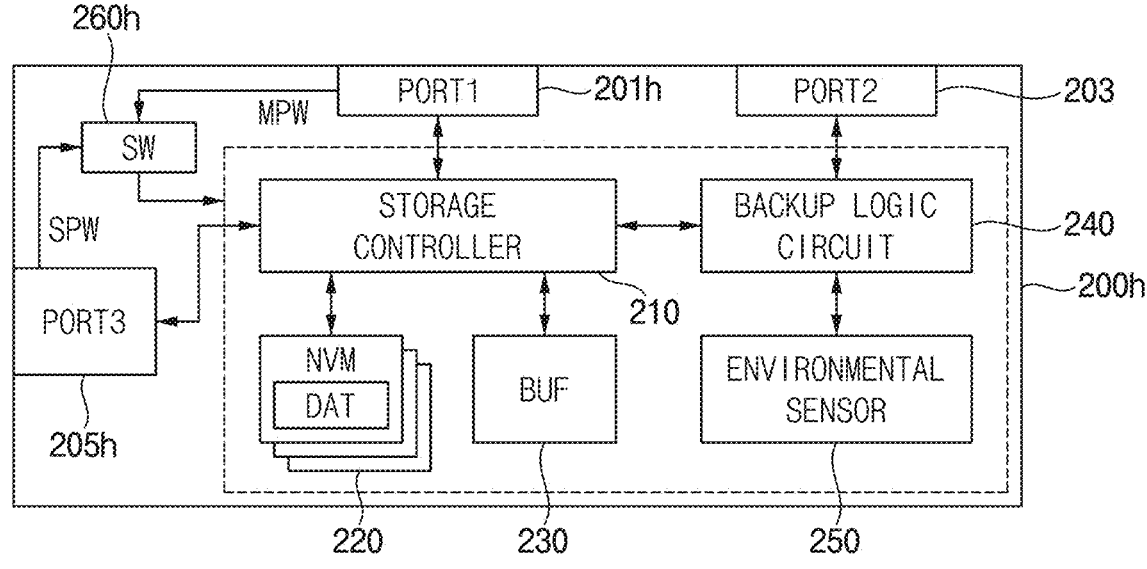

FIGS. 29 and 30 are block diagrams illustrating a storage device according to some example embodiments. The descriptions repeated with FIG. 3 will be omitted for brevity.

Referring to FIG. 29, a storage device 200g may include a first port 201g, a second port 203g, a storage controller 210, a plurality of nonvolatile memories 220, a buffer memory 230, a backup logic circuit 240, an environmental sensor 250 and a switch (SW) 260g.

The storage device 200g of FIG. 29 may be the same as and/or substantially similar to the storage device 200 in FIG. 3, except that the storage device 200g further includes the switch 260g and the first and second ports 201g and 203g are partially changed.

The storage device 200g may receive a main power MPW through the first port 201g, and may receive a secondary power (or auxiliary power) SPW through the second port 203g. The switch 260g may select one of the main power MPW and the secondary power SPW, and may provide the selected power to the storage controller 210, the plurality of nonvolatile memories 220, the buffer memory 230, the backup logic circuit 240 and the environmental sensor 250. For example, when the storage device 200g normally operates, the switch 260g may be electrically connected to the first port 201g to output the main power MPW, and connections to the second port 203g and the secondary power SPW may be blocked or cut off. For example, when the storage device 200g abnormally operates, e.g., when the main power MPW is not normally supplied due to the emergency situation, the switch 260g may be electrically connected to the second port 203g to output the secondary power SPW, and connections to the first port 201g and the main power MPW may be blocked. For example, although not illustrated in detail, the secondary power SPW may be supplied through a power stabilization circuit such as an inrush current protection circuit and/or through a secondary power source (not illustrated).

Referring to FIG. 30, a storage device 200h may include a first port 201h, a second port 203, a third port 205h, a storage controller 210, a plurality of nonvolatile memories 220, a buffer memory 230, a backup logic circuit 240, an environmental sensor 250 and a switch 260h.

The storage device 200h of FIG. 30 may be the same as and/or substantially similar to the storage device 200 in FIG. 3, except that the storage device 200h further includes the third port 205h and the switch 260h and the first port 201h is partially changed.

The third port 205h may be connected to the storage controller 210, may be different from the first and second ports 201h and 203, and may be implemented independently, individually and/or physically separated from the first and second ports 201h and 203. For example, the third port 205h may be a debug port used to perform a debugging operation on the storage device 200h. For example, the third port 205h may be implemented based on a debugging protocol such as a joint test action group (JTAG), a serial wire debug (SWD), and/or the like.

The storage device 200h may receive the main power MPW through the first port 201h, and may receive the secondary power SPW through the third port 205h. The switch 260h may select one of the main power MPW and the secondary power SPW, and may provide the selected power to the storage controller 210, the plurality of nonvolatile memories 220, the buffer memory 230, the backup logic circuit 240 and the environmental sensor 250. The switch 260h may be the same as and/or substantially similar to the switch 260g in FIG. 29.

As described above, the date/time information and the information of changing the main driver to identify responsibilities between the human driver and the ALKS may be stored in the DSSAD. In addition, even if the main power of the vehicle is not available, the data stored in the DSSAD should be searchable and usable. Thus, a function of reading the DSSAD data from the storage device in which the DSSAD data is stored is required even when the vehicle power is shut down.

In the storage device according to example embodiments, the secondary power SPW may be provided through the second port 203g in FIG. 29 and/or the third port 205h in FIG. 30. Accordingly, even when the emergency situation occurs, the data loss may be prevented, and the accident responsibility analysis may be performed quickly by reading the DSSAD data. For example, when the third port 205h is implemented as the debug port, a secure function such as authentication may be applied to the debug port such that the debug port is used by only the authorized user, and the debug port may only be used for reading data such that the modification of the DSSAD data through the debug port is impossible.

In some example embodiments, the storage system may be implemented by applying or employing one of the storage devices 200g and 200h of FIGS. 29 and 30 to at least one of the storage systems 10a, 10b, 10c, 10d, 10e and 10f of FIGS. 17, 20, 24, 26, 27 and 28.

As will be appreciated by those skilled in the art, the example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 31:
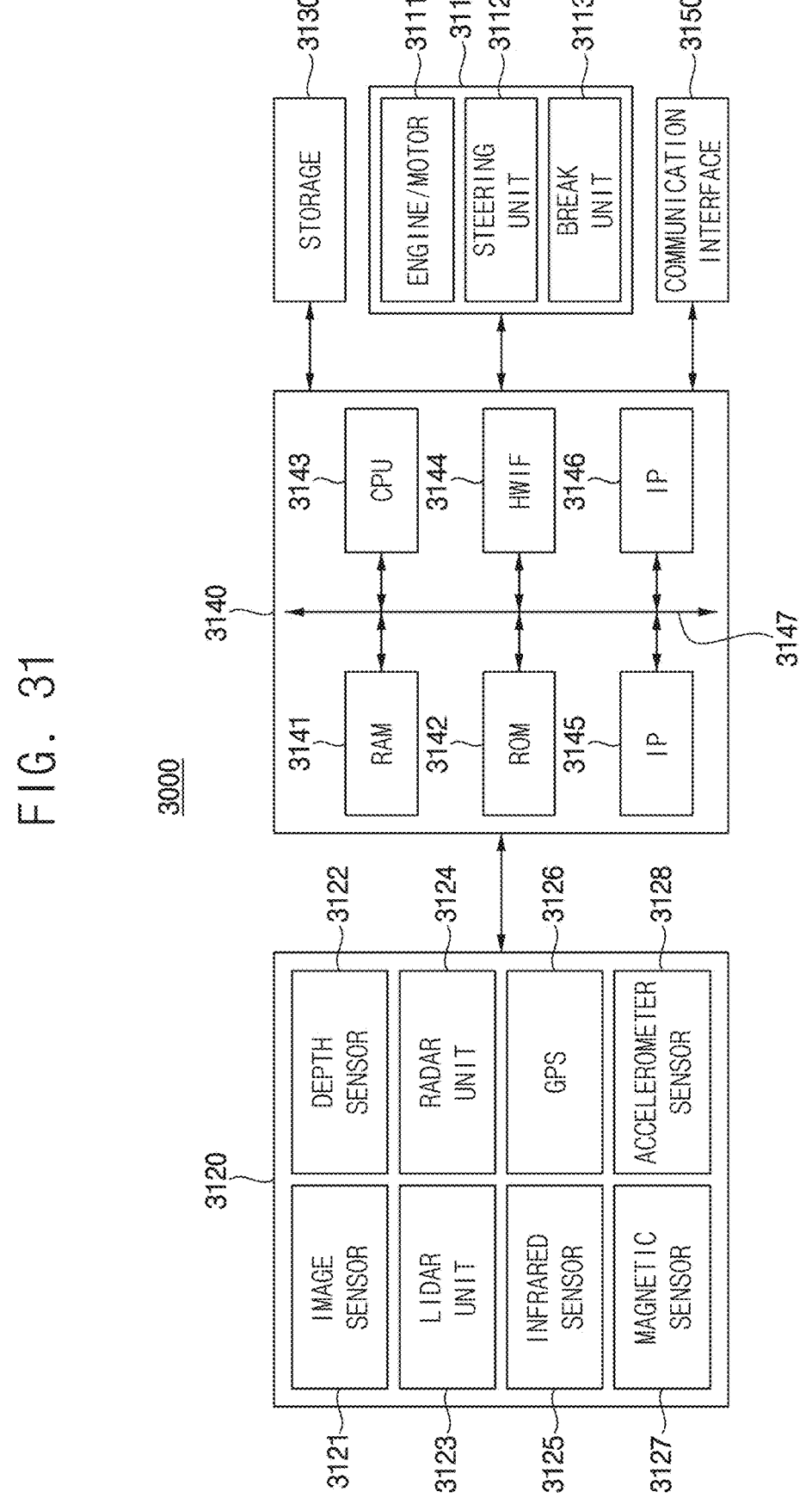
FIGS. 31 and 32 are diagrams illustrating an autonomous driving system according to some example embodiments.
Figure 32:
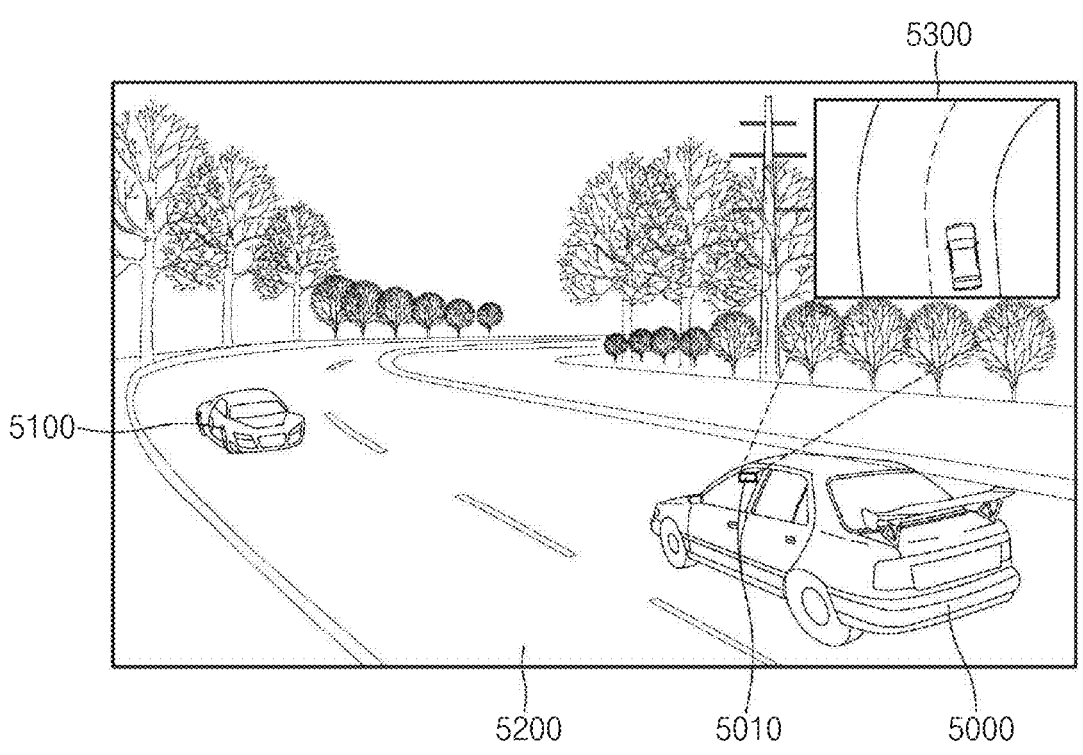

FIGS. 31 and 32 are diagrams illustrating an autonomous driving system according to example embodiments.

Referring to FIG. 31, an autonomous driving system 3000 may include a driver (e.g., including circuitry) 3110, a sensor 3120, a storage 3130, a controller (e.g., including processing circuitry) 3140, and a communication interface 3150.

The driver 3110 may, for example, be a configuration for driving the autonomous driving system 3000 and may include various circuitry configured thereto. When the autonomous driving system 3000 is implemented with an autonomous vehicle, the driver 3110 may include various circuitry and/or components, such as, for example, an engine/motor 3111, a steering unit 3112, a brake unit 3113, and/or the like.

The sensor 3120 may include a number of sensors configured to sense information relating to a surrounding environment of the autonomous driving system 3000. For example, the sensor 3120 may include at least one of an image sensor 3121, a depth sensor 3122, a light detection and ranging (LIDAR) unit 3123, a radio detection and ranging (RADAR) unit 3124, an infrared sensor 3125, a global positioning system (GPS) 3126, a magnetic sensor 3127, an accelerometer sensor 3128, and/or the like. However, the example embodiments are not limited thereto, and the sensors 3120 may include more or fewer sensors than illustrated.

The controller 3140 may include a random access memory (RAM) 3141, a read-only memory (ROM) 3142, a central processing unit (CPU) 3143, a hardware interface device (HWIF) 3144, a plurality of intellectual property protected devices (IPs) 3145 and 3146, a bus 3147, and/or the like. The storage 3130 may store data necessary for the controller 3140 to execute various processes. The communication interface 3150 may include various communication circuits and may be configured to facilitate communication between the autonomous driving system 3000 and an external device.

The storage 3130 may include the storage device according to at least one of the above example embodiments, and may perform the data backup method according to the above example embodiments.

Referring to FIG. 32, an autonomous driving system 5010 may be installed in an autonomous vehicle 5000. For example, the autonomous driving system 5010 may detect a road 5200 including a fixed pattern and another vehicle 5100 moving in time, by analyzing the at least one image sequence 5300 received from cameras. The autonomous driving system 5010 may be the same as or substantially similar to the autonomous driving system 3000 of FIG. 31 and/or may include the storage device according to at least one of the above example embodiments, and/or may perform the data backup method according to the above example embodiments.

The example embodiments may be applied to various electronic devices and systems that include the storage devices. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A data backup method of a storage device, comprising:

periodically performing a backup operation, the backup operation including backing up at least a portion of a plurality of data stored in the storage device to an external device;

receiving environment information from at least one environmental sensor such that an operating environment in which the storage device is operating is monitored;

generating an event detection signal based on a determination that the environment information indicates that an emergency situation, in which the operating environment has changed to be out of a reference range, has occurred; and immediately outputting at least first data, among the plurality of data stored in the storage device, such that the at least first data is backed up to the external device located outside the storage device in response to the generating the event detection signal, wherein the storage device includes a storage controller including processing circuitry configured to control operations of a plurality of nonvolatile memories, a first port connected to the storage controller, and configured to be used in reading and the storing of the plurality of data in the storage device, a backup logic circuit connected to the storage controller, the backup logic circuit including processing circuitry configured to control the backup operation, and a second port different from the first port, the second port connected to the backup logic circuit, and wherein the second port is configured to provide an interface for a protocol different from a protocol of the first port, wherein, the outputting the at least first data includes outputting the at least first data from the storage device through the second port, and wherein, the first data includes backup target data collected from a first time point at which a data backup operation had most recently performed to a second time point at which the emergency situation occurred.

2. The data backup method of claim 1, wherein the at least one environmental sensor includes at least one of a temperature sensor or a water sensor.

3. The data backup method of claim 1, wherein receiving the environment information includes periodically receiving a current temperature of the operating environment from a temperature sensor.

4. The data backup method of claim 3, wherein generating the event detection signal includes:

comparing the current temperature with a reference temperature and generating a fire detection signal representing that fire has occurred in response to the current temperature becoming higher than the reference temperature.

5. The data backup method of claim 1, wherein receiving the environment information includes periodically receiving a current amount of water in the operating environment from a water sensor.

6. The data backup method of claim 5, wherein generating the event detection signal includes:

comparing the current amount of water with a reference amount of water, and generating a flooding detection signal representing that flooding has occurred in response to the current amount of water becoming larger than the reference amount of water.

7. The data backup method of claim 1, wherein the protocol for the second port is a communication protocol and the protocol for the first port is a data transmission protocol, and the outputting the at least first data among the plurality of data includes identifying the backup target data among the plurality of data, and immediately outputting the backup target data through the second port, the outputting based on the communication protocol.

8. The data backup method of claim 7, wherein the immediately outputting the at least first data among the plurality of data further includes checking whether a first network interface is operating normally, the first network interface being located outside the storage device and connecting the storage device to the external device.

9. The data backup method of claim 8, wherein the backup target data are transmitted to an external server through the first network interface and at least one external network in response to determining that the first network interface is operating normally, the at least one external network and the external server are located outside the storage device, the storage device is in a first space, and the external server is in a second space spaced apart from the first space.

10. The data backup method of claim 9, wherein the backup target data are transmitted to the external server through a second network interface and the at least one external network in response to determining that the first network interface is operating abnormally, and the second network interface is located inside the storage device.

11. The data backup method of claim 8, wherein the backup target data are transmitted to a secondary storage device, in response to determining that the first network interface is operating abnormally, the secondary storage device is outside the storage device, and the storage device and the secondary storage device are in a first space.

12. The data backup method of claim 1, further comprising:

periodically outputting at least second data, among the plurality of data, from the storage device such that the at least second data is periodically backed up to the external device in response to the event detection signal not being generated.

13. The data backup method of claim 1, wherein the storage device is included in an autonomous driving system, and the plurality of data include at least one of data storage system for automated driving (DSSAD) or event data recorder (EDR) data that are generated and collected while the autonomous driving system is operating.

14. A storage device comprising: a plurality of nonvolatile memories configured to store a plurality of data; a storage controller configured to control operations of the plurality of nonvolatile memories; a first port connected to the storage controller, and configured to be used to read and to store the plurality of data in the plurality of nonvolatile memories; at least one first environmental sensor configured to monitor an operating environment in which the storage device is operating; a backup logic circuit configured to control a data backup operation of backing up the plurality of data to an external device, the external device located outside the storage device; and a second port connected to the backup logic circuit, the second port configured to provide an interface for a protocol different from a protocol of the first port, wherein the backup logic circuit is configured to periodically perform the data backup operation, the data backup operation including backing up at least a portion of the plurality of data stored in the storage device to the external device; receive first environment information from the at least one first environmental sensor, generate an event detection signal based on a determination that the first environment information indicates that an emergency situation, in which the operating environment has changed to be out of a reference range, has occurred, and immediately output at least first data, among the plurality of data, from the storage device such that the at least first data is backed up to the external device in response to the generated event detection signal, the first data including backup target data collected from a first time point at which the data backup operation had most recently performed to a second time point at which the emergency situation occurred.

15. The storage device of claim 14, wherein the backup logic circuit is configured to further receive second environment information from at least one second environmental sensor, the at least one second environmental sensor is located outside the storage device and is configured to monitor the operating environment, and the event detection signal is generated based on the first environment information and the second environment information.

16. The storage device of claim 14, wherein the backup logic circuit is located inside the storage controller.

17. The storage device of claim 14, wherein the first port is configured to receive a main power, and the second port is configured to receive a secondary power.

18. The storage device of claim 14, further comprising: a third port different from the first port and the second port, and wherein the first port is configured to receive a main power, and the third port is configured to receive a secondary power.

19. A data backup method of a storage device included in an autonomous driving system, comprising:

periodically receiving at least one of a current temperature of an operating environment or a current amount of water in the operating environment from at least one environmental sensor;

periodically performing a backup operation, the backup operation including outputting at least first data, among a plurality of autonomous driving-related data stored the storage device, such that the at least first data among the plurality of autonomous driving-related data stored in the storage device are backed up to an external device located outside the storage device;

generating a fire detection signal representing that fire has occurred in the autonomous driving system in response to the current temperature becoming higher than a reference temperature or generating a flooding detection signal representing that flooding has occurred in the autonomous driving system in response to the current amount of water becoming larger than a reference amount of water; and immediately outputting at least second data, among the plurality of autonomous driving-related data, in response to at least one of the generated fire detection signal or the generated flooding detection signal such that the at least second data among the plurality of autonomous driving-related data are immediately backed up to the external device, the second data includes backup target data collected from a first time point at which the outputting of the at least first data had most recently performed to a second time point at which the at least one of the generated fire detection signal or the generated flooding detection signal occurred, wherein the storage device includes a storage controller including processing circuitry configured to control operations of a plurality of nonvolatile memories, a first port connected to the storage device and configured to be used to read and to store the plurality of autonomous driving-related data in the storage device, a backup logic circuit connected to the storage controller, the backup logic circuit including processing circuitry configured to control the backup operation, and a second port different from the first port, the second port connected to the backup logic circuit and configured to be used to back up the plurality of autonomous driving-related data to the external device, wherein the second port is configured to provide an interface for a protocol different from a protocol of the first port, and wherein the immediately outputting the at least second data among the plurality of autonomous driving-related data includes identifying the backup target data among the plurality of autonomous driving-related data, checking whether a first network interface operates normally, the first network interface located outside the storage device, included in the autonomous driving system, and configured to be used for an external communication, in response to determining that the first network interface is operating normally, immediately outputting the backup target data through the second port to transmit the backup target data to an external server through the first network interface and at least one external network, the external server and the at least one external network being located outside the autonomous driving system, and in response to determining that the first network interface is operating abnormally, immediately outputting the backup target data to a secondary storage device through the second port, the secondary storage device being located outside the storage device and being included in the autonomous driving system.

* * * * *